United States Patent
Zorgui et al.

(10) Patent No.: US 12,317,218 B2
(45) Date of Patent: May 27, 2025

(54) ML-BASED MEASUREMENTS FOR UPLINK POSITIONING

(71) Applicant: QUALCOMM Incorporated, San Diego, CA (US)

(72) Inventors: Marwen Zorgui, San Diego, CA (US); Ahmed Attia Abotabl, San Diego, CA (US); Ahmed Elshafie, San Diego, CA (US); Mohammed Ali Mohammed Hirzallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 18/049,949

(22) Filed: Oct. 26, 2022

(65) Prior Publication Data

US 2024/0147407 A1    May 2, 2024

(51) Int. Cl.
*H04W 64/00*    (2009.01)
(52) U.S. Cl.
CPC .................................. *H04W 64/00* (2013.01)
(58) Field of Classification Search
CPC ... H04W 64/00; H04W 24/02; H04W 92/045; G06N 3/088; G06N 3/09; G06N 3/092; G06N 20/00
USPC ...................................................... 455/456.1
See application file for complete search history.

(56) References Cited

U.S. PATENT DOCUMENTS

| | | | |
|---|---|---|---|
| 11,125,849 B2 * | 9/2021 | Shi | H04W 8/22 |
| 2020/0322756 A1 * | 10/2020 | Sosnin | H04W 4/029 |
| 2022/0124457 A1 * | 4/2022 | Priyanto | H04W 4/029 |
| 2022/0312151 A1 | 9/2022 | Yerramalli et al. | |
| 2024/0057022 A1 * | 2/2024 | Ashraf | H04W 64/00 |
| 2024/0284386 A1 * | 8/2024 | Huang | G01S 5/0009 |
| 2024/0295625 A1 * | 9/2024 | Hasegawa | G01S 5/0263 |

(Continued)

FOREIGN PATENT DOCUMENTS

| | | |
|---|---|---|
| WO | 2022031673 A1 | 2/2022 |
| WO | 2022155244 A2 | 7/2022 |

OTHER PUBLICATIONS

Butt, "ML-Assisted UE Positioning: Performance Analysis and 5G Architecture Enhancements," arXiv Aug. 25, 2021 (Year: 2021).*

(Continued)

*Primary Examiner* — Juan A Torres
(74) *Attorney, Agent, or Firm* — Procopio, Cory, Hargreaves & Savitch LLP/Qualcomm

(57) ABSTRACT

Aspects presented herein may enable an LMF to configure AI/ML-based techniques/measurements for a set of base stations/TRPs to improve the performance of UL-based positioning. In one aspect, a network entity transmits a configuration to at least one network node to configure the at least one network node to perform an UL-based positioning measurement with at least one ML model, where each of the at least one ML model is associated with a corresponding ML model ID in which the at least one network node uses for the UL-based positioning measurement, where the UL-based positioning measurement is for a set of SRSs from a UE. The network entity receives the UL-based positioning measurement for the set of SRSs from the at least one network node. The network entity estimates a position of the UE based on the UL-based positioning measurement for the set of SRSs.

30 Claims, 18 Drawing Sheets

(56) References Cited

U.S. PATENT DOCUMENTS

2024/0397476 A1* 11/2024 Wang ..................... H04W 8/22

OTHER PUBLICATIONS

3GPP TS 38.305: "3rd Generation Partnership Project, Technical Specification Group Radio Access Network, NG Radio Access Network (NG-RAN), Stage 2 functional specification of User Equipment (UE) positioning in NG-RAN (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.2.0, Sep. 29, 2022, pp. 1-133, XP052211357, See clauses 4.3-4.3.15, 8.3.4.3.1 and 8.10-8.10.2.1.
International Search Report and Written Opinion—PCT/US2023/032793—ISA/EPO—Jan. 4, 2024.

\* cited by examiner

| Measurement results |
|---|
| NCGI and TRP ID of the measurement |
| UL-RTOA |
| UL-SRS-RSRP |
| Time stamp of the measurement |
| Quality for each measurement |
| Beam Information for each measurement |

| Measurement results |
|---|
| NCGI and TRP ID of the measurement |
| gNB Rx-Tx time difference measurement |
| UL-SRS-RSRP |
| UL Angle of Arrival (azimuth and/or elevation) |
| Time stamp of the measurement |
| Quality for each measurement |
| Beam Information for each measurement |

| IE/Group Name | IE type and reference |
|---|---|
| Message Type | 9.2.3 |
| NRPPa Transaction ID | 9.2.4 |
| LMF Measurement ID | INTEGER (1..65536, ...) |
| TRP Measurement Request List | |
| >TRP Measurement Request Item | |
| >>TRP ID | 9.2.24 |
| TRP Measurement Quantities | |
| >TRP Measurement Quantities Item | |
| >TRP Measurement Type | ENUMERATED (gNB-RxTxTimeDiff (AI/ML model ID 001), UL-SRS-RSRP (AI/ML model ID 002), UL-AoA (AI/ML model ID 003), UL-RTOA (AI/ML model ID 004), ..., Multiple UL-AoA (AI/ML model ID N-1), UL SRS-RSRPP (AI/ML model ID N)) |
| >Timing Reporting Granularity Factor | INTEGER (0..5) |

FIG. 11

| IE/Group Name | IE type and reference |
|---|---|
| Message Type | 9.2.3 |
| NRPPa Transaction ID | 9.2.4 |
| LMF Measurement ID | INTEGER (1..65536, ...) |
| TRP Measurement Request List | |
| >TRP Measurement Request Item | |
| >>TRP ID | 9.2.24 |
| TRP Measurement Quantities | |
| >TRP Measurement Quantities Item | |
| >TRP Measurement Type | ENUMERATED (gNB-RxTxTimeDiff, UL-SRS-RSRP, UL-AoA, UL-RTOA,..., Multiple UL-AoA, UL SRS-RSRPP, NR-ML-based-UL-Measurement) ~1302 |
| >Timing Reporting Granularity Factor | INTEGER (0..5) |

ML-BASED MEASUREMENTS FOR UPLINK POSITIONING

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits a configuration to at least one network node to configure the at least one network node to perform an uplink (UL)-based positioning measurement with at least one machine learning (ML) model, where each of the at least one ML model is associated with a corresponding ML model identification (ID) in which the at least one network node uses for the UL-based positioning measurement, where the UL-based positioning measurement is for a set of sounding reference signals (SRSs) from a user equipment (UE). The apparatus receives the UL-based positioning measurement for the set of SRSs from the at least one network node. The apparatus estimates a position of the UE based on the UL-based positioning measurement for the set of SRSs.

In an aspect of the disclosure, a method, a computer-readable medium, and an apparatus are provided. The apparatus receives a configuration from a network entity to perform an UL-based positioning measurement with at least one ML model, where each of the at least one ML model is associated with a corresponding ML model ID to be used for the UL-based positioning measurement, where the UL-based positioning measurement is for a set of SRSs from a UE. The apparatus performs the UL-based positioning measurement for the set of SRSs from the UE with the at least one ML model. The apparatus transmits the UL-based positioning measurement for the set of SRSs to the network entity.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a diagram illustrating an example of information elements (IEs) that may be included in a measurement request message from an LMF to a base station/transmission reception point (TRP) in accordance with various aspects of the present disclosure.

FIG. 13 is a diagram illustrating an example of IEs that may be included in a measurement request message from an LMF to a base station/TRP in accordance with various aspects of the present disclosure.

DETAILED DESCRIPTION

Figure 1:
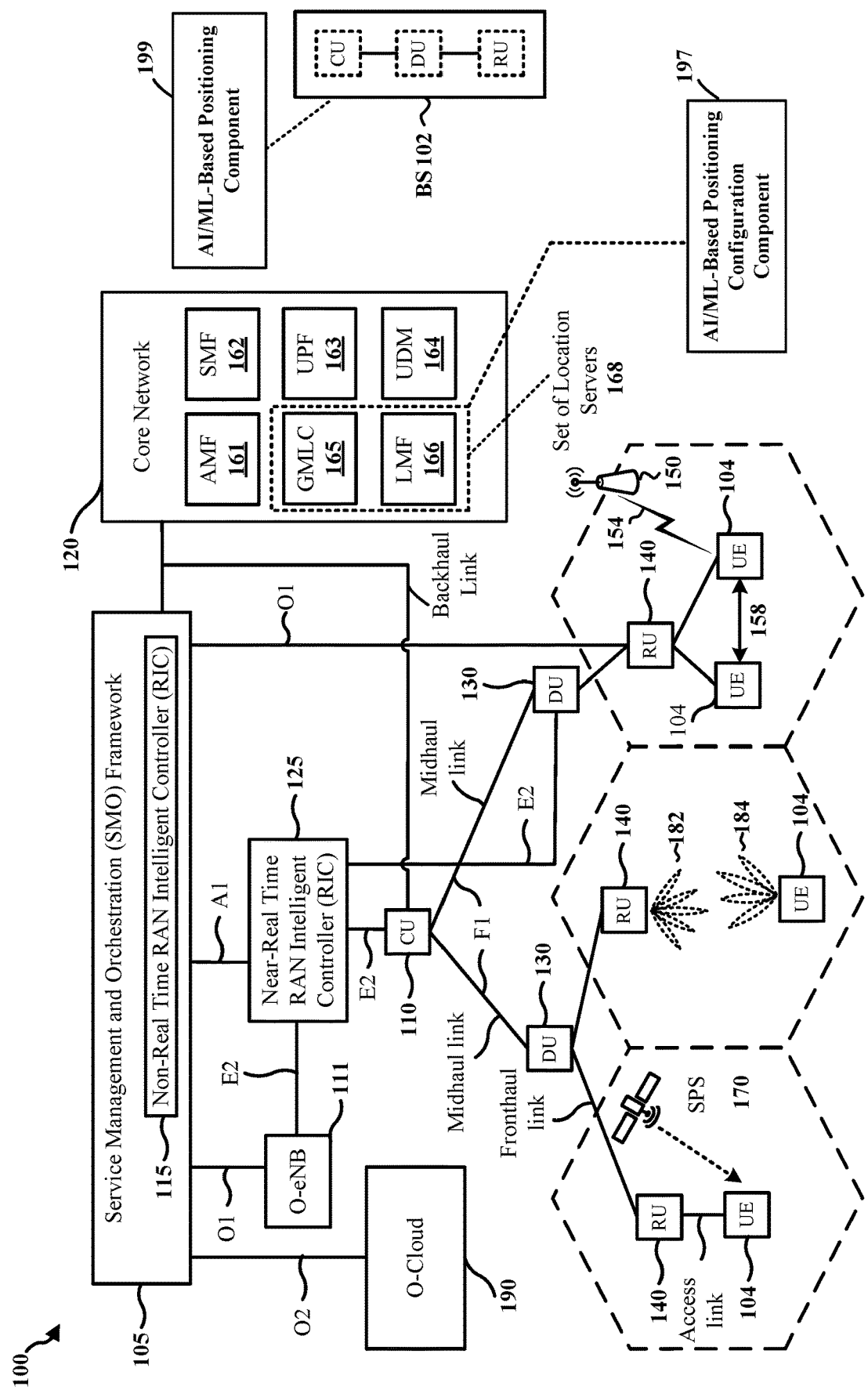
FIG. 1 is a diagram illustrating an example of a wireless communications system and an access network.

Aspects presented herein may improve the performance of UL-based positioning using AI/ML-based techniques. For example, aspects presented herein provide AI/ML-based techniques/measurements which may be configured for one or more positioning entities (e.g., entities that are associated with the positioning of a UE, such as a base station, a TRP, an LMF, and/or the UE itself) to improve existing UL-based positioning mechanisms. The AI/ML techniques/measurements described herein may be applied at the base station or TRP level, and/or based on LMF configuration(s). Aspects presented herein also provide a framework (e.g., an explicit framework) that enables the configuration of AI/ML-based techniques/measurements, and signaling configurations/capabilities associated with the AI/ML techniques/measurements from a network node (e.g., a base station) to a location server (e.g., an LMF). In some examples, aspects presented herein may be configured at an LMF, and may be transparent to UEs. In addition, the AI/ML model presented herein may be used in at least two ways. One way is to improve the already specified positioning mechanisms, such as providing better ways for computing already specified measurements such as UL-AoA or UL-RTOA, etc. Another way is to implement the AI/ML model as part of a new/updated positioning mechanism. For example, after a TRP receives a set of SRSs from a UE, the TRP may be configured to run a feature extraction on the received set of SRSs, and the TRP may send the obtained results (e.g., the extracted features) to an LMF for a UE position computation/estimation. In some examples, aspects presented herein.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the LMF 166 may be configured to transmit a configuration to at least one network node to configure the at least one network node to perform an UL-based positioning measurement with at least one ML model, where each of the at least one ML model is associated with a corresponding ML model ID in which the at least one network node uses for the UL-based positioning measurement, where the UL-based positioning measurement is for a set of SRSs from a UE; receive the UL-based positioning measurement for the set of SRSs from the at least one network node; and estimate a position of the UE based on the UL-based positioning measurement for the set of SRSs (e.g., via the AI/ML-based positioning configuration component 197).

In certain aspects, the base station 102 may be configured to receive a configuration from a network entity to perform an UL-based positioning measurement with at least one ML model, where each of the at least one ML model is associated with a corresponding ML model ID to be used for the UL-based positioning measurement, where the UL-based positioning measurement is for a set of SRSs from a UE; perform the UL-based positioning measurement for the set of SRSs from the UE with the at least one ML model; and transmit the UL-based positioning measurement for the set of SRSs to the network entity (e.g., via the AI/ML-based positioning component 199).

Figure 2:
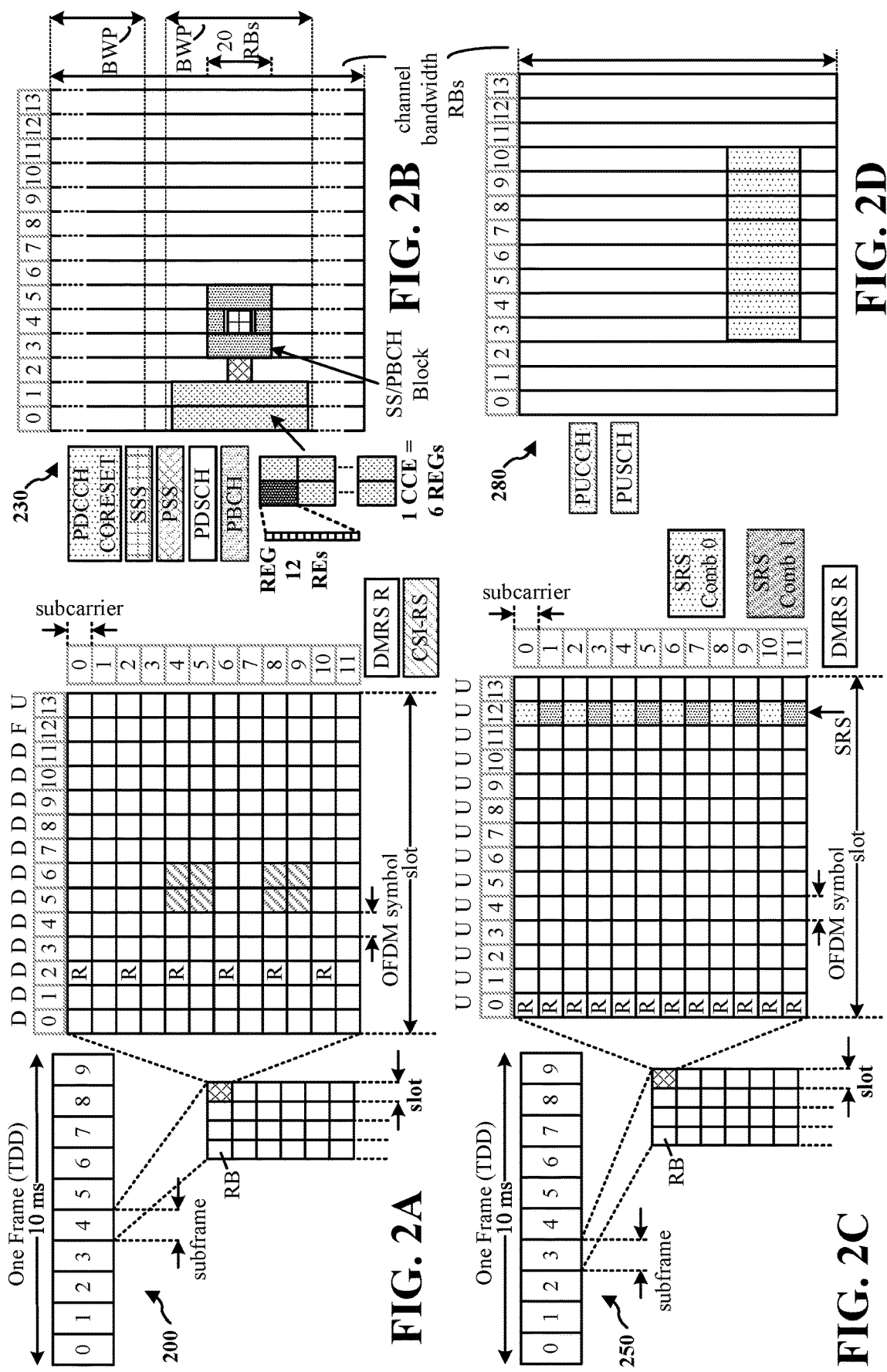
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
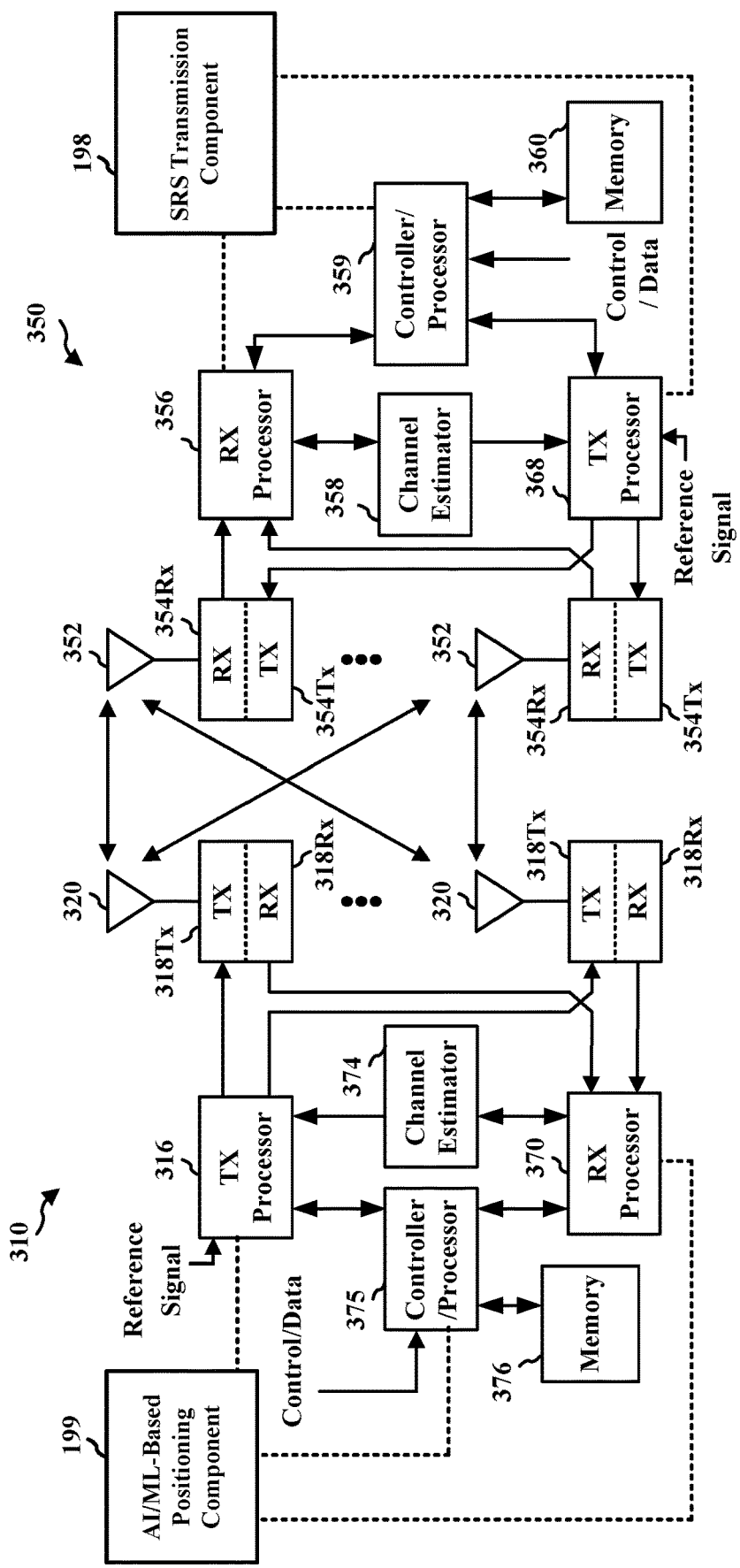
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SRS transmission component 198 of FIG. 3.

At least one of the TX processor 316, the RX processor 370, and the controller/processor 375 may be configured to perform aspects in connection with the AI/ML-based positioning component 199 of FIG. 1.

Figure 4:
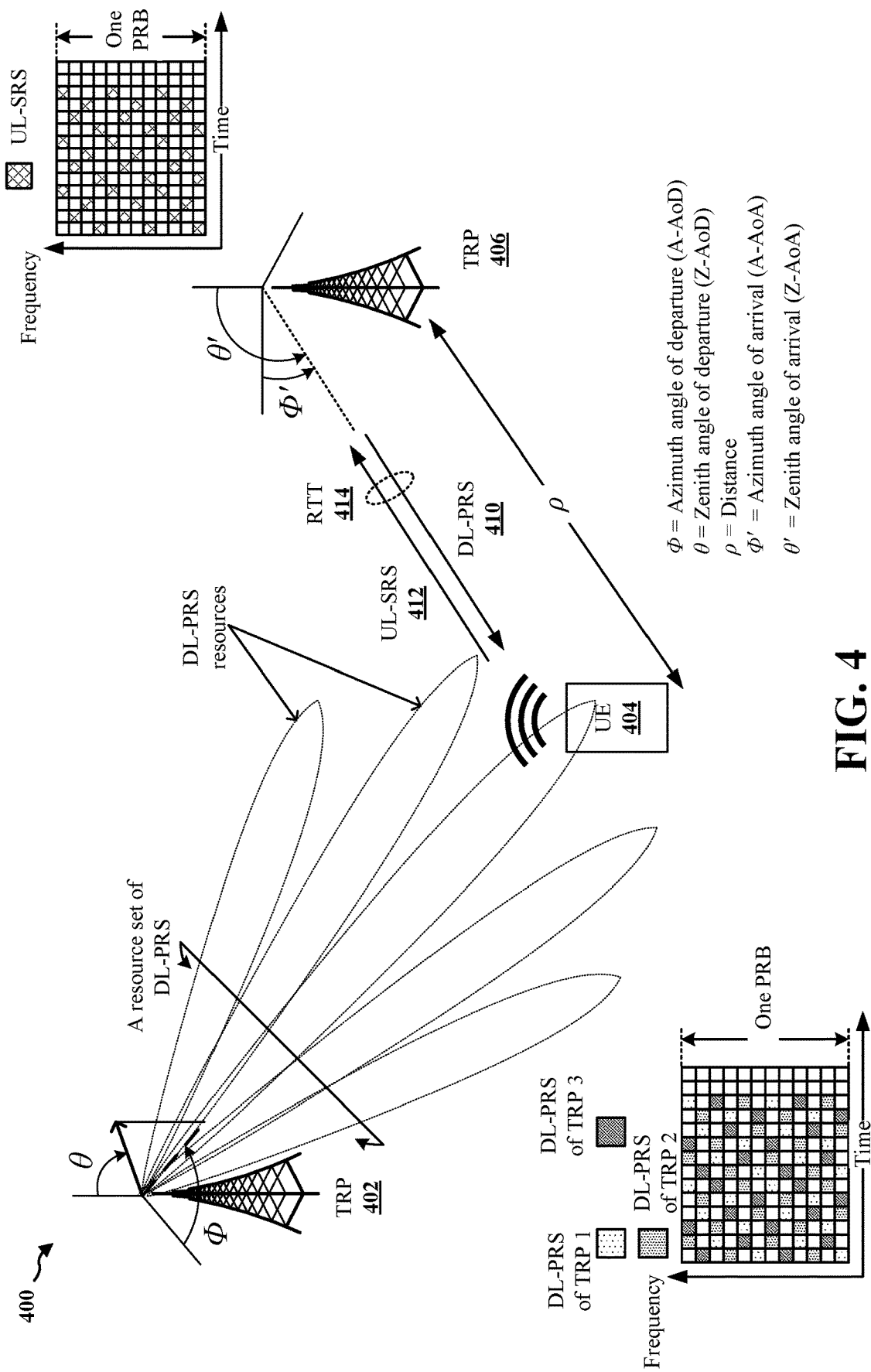
FIG. 4 is a diagram illustrating an example of a UE positioning based on reference signal measurements in accordance with various aspects of the present disclosure.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $|T_{SRS\_RX} - T_{PRS\_TX}| - |T_{SRS\_TX} - T_{PRS\_RX}|$. Accordingly, multi-RTT positioning may make use of the UE Rx-Tx time difference measurements (i.e., $|T_{SRS\_TX} - T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL SRS-RSRP at multiple TRPs 402, 406 of uplink signals transmitted from UE 404. The UE 404 measures the UE reception (Rx)-transmission (Tx) (Rx-Tx) time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL time difference of arrival (UL-TDOA) measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL angle-of-arrival (UL-AoA) positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In UL-based positioning, which may include the UL-AoA, the UL-RTOA, the UL-TDOA, multi-RTT positioning, and/or the base station/TRP Rx-Tx time difference positioning, etc., a base station/TRP, rather than a UE, may be responsible for performing the positioning measurements on the UL-SRS transmitted from the UE.

Figure 5:
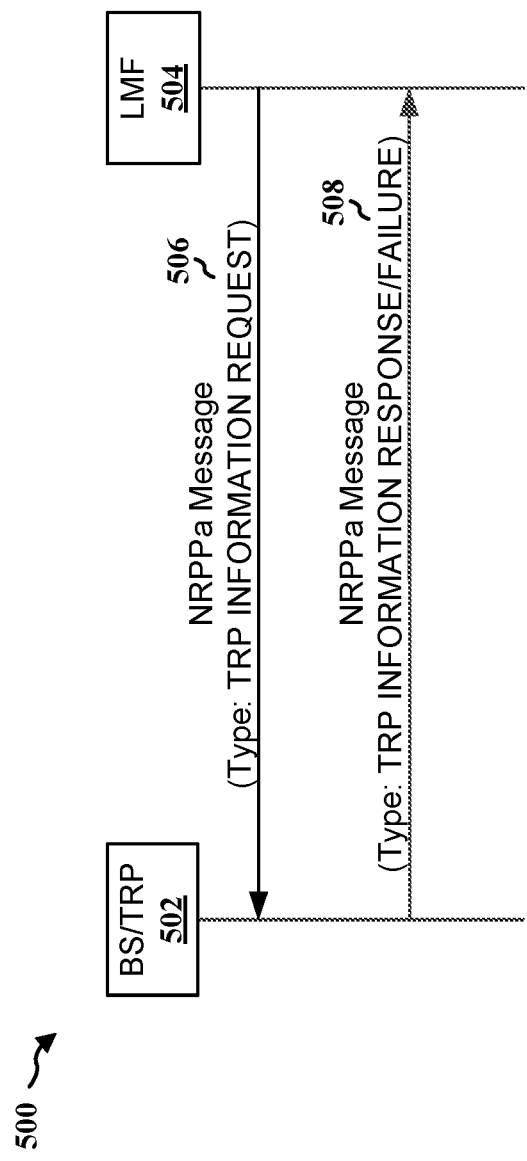
FIG. 5 is a communication flow illustrating an example of a location management function (LMF)-initiated transmission reception point (TRP) information exchange procedure in accordance with various aspects of the present disclosure.

FIG. 5 is a communication flow 500 illustrating an example of a location management function (LMF)-initiated transmission reception point (TRP) information exchange procedure in accordance with various aspects of the present disclosure. The numberings associated with the communication flow 500 do not specify a particular temporal order and are merely used as references for the communication flow 500. Aspects presented herein show an example TRP information exchange operation from a base station 502 (or a network entity) to an LMF 504 for an UL-AoA positioning session.

At 506, the LMF 504 may determine that certain TRP configuration information is desired (e.g., as part of a periodic update or as triggered by operations, administration, and maintenance (OAM)) and send an NR Positioning Protocol A (NRPPa) TRP information request message to the base station 502. This TRP information request message may include an indication of which specific TRP configuration information is requested.

At 508, in response, the base station 502 may provide the requested TRP information in an NRPPa TRP information response message, if available at the base station 502. If the base station 502 is not able to provide any information, it may return an TRP information failure message indicating the cause of the failure.

Figure 6:
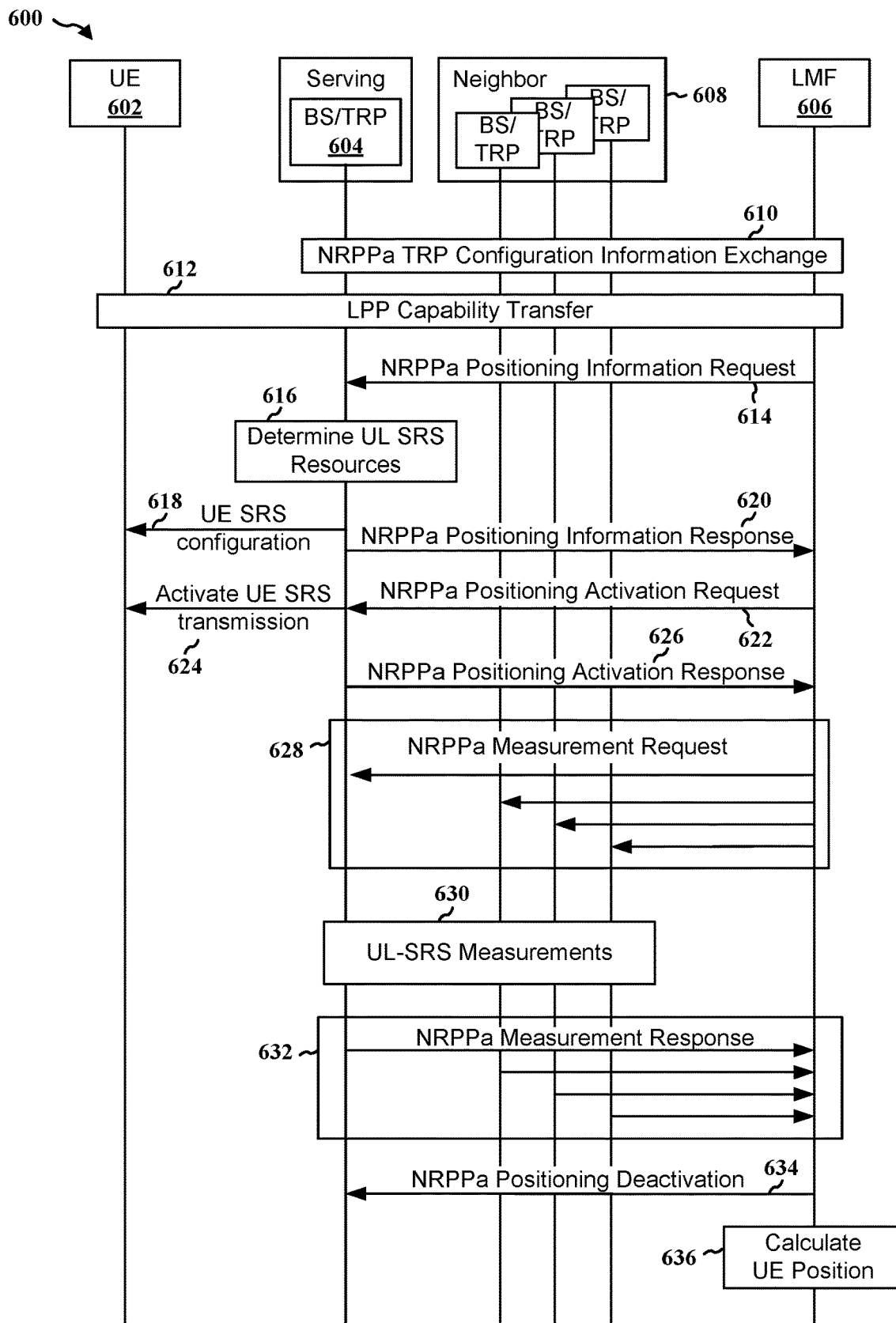
FIG. 6 is a communication flow illustrating an example UL angle-of-arrival (UL-AoA) positioning procedure in accordance with various aspects of the present disclosure.

FIG. 6 is a communication flow 600 illustrating an example UL-AoA positioning procedure in accordance with various aspects of the present disclosure. The numberings associated with the communication flow 600 do not specify a particular temporal order and are merely used as references for the communication flow 600. Aspects presented herein show an example procedure of an LMF 606 configuring a serving base station 604 and one or more neighboring base stations 608 to perform positioning of a target device (e.g., a UE 602) based on UL-AoA positioning.

At 610, the LMF 606 may use the procedure discussed in connection with FIG. 5 to obtain the TRP information specified for UL-AoA positioning from one or more base stations/TRPs, such from the serving base station 604 and one or more neighboring base stations 608.

At 612, the LMF 606 may request the positioning capabilities of the UE 602, such as using an LTE Positioning Protocol (LPP) capability transfer procedure.

At 614, the LMF 606 may send a NRPPa positioning information request message to the serving base station 604 to request UL-SRS configuration information for the UE 602.

At 616, the serving base station 604 may determine the resources available for UL-SRS and configure the UE 602 with the UL-SRS resource sets as shown at 618.

At 620, the serving base station 604 may provide the UL-SRS configuration information to the LMF 606, such as via a NRPPa positioning information response message.

At 622, in the case of semi-persistent (SP) or aperiodic (AP) SRS, the LMF 606 may request activation of UE SRS transmission by sending an NRPPa positioning activation request message to the serving base station 604 of the UE 602. Then, at 624 and 626, the serving base station 604 may activate the UL-SRS transmission for the UE 602 and send an NRPPA positioning activation response message. The UE 602 may begin the UL-SRS transmission according to the time domain behavior of the UL-SRS resource configuration.

At 628, the LMF 606 may provide the UL-SRS configuration to the selected serving base station 604 and one or more neighboring base stations 608 in a NRPPa measurement request message. The message may include all information specified to enable the serving base station 604/TRPs to perform the UL measurements.

At 630, each base station configured at 628 (e.g., the serving base station 604 and one or more neighboring base stations 608) may measure the UL-SRS transmissions from the UE 602.

At 632, each base station configured at 628 (e.g., the serving base station 604 and one or more neighboring base stations 608) may report the UL-SRS measurements to the LMF 606 in a NRPPa measurement response message.

At 634, the LMF 606 may send a NRPPa positioning deactivation message to the serving base station 604.

At 636, the LMF 606 may calculate and determine the position of the UE 602 based on the UL-SRS measurements obtained at 632.

Figures 7A, 7B:
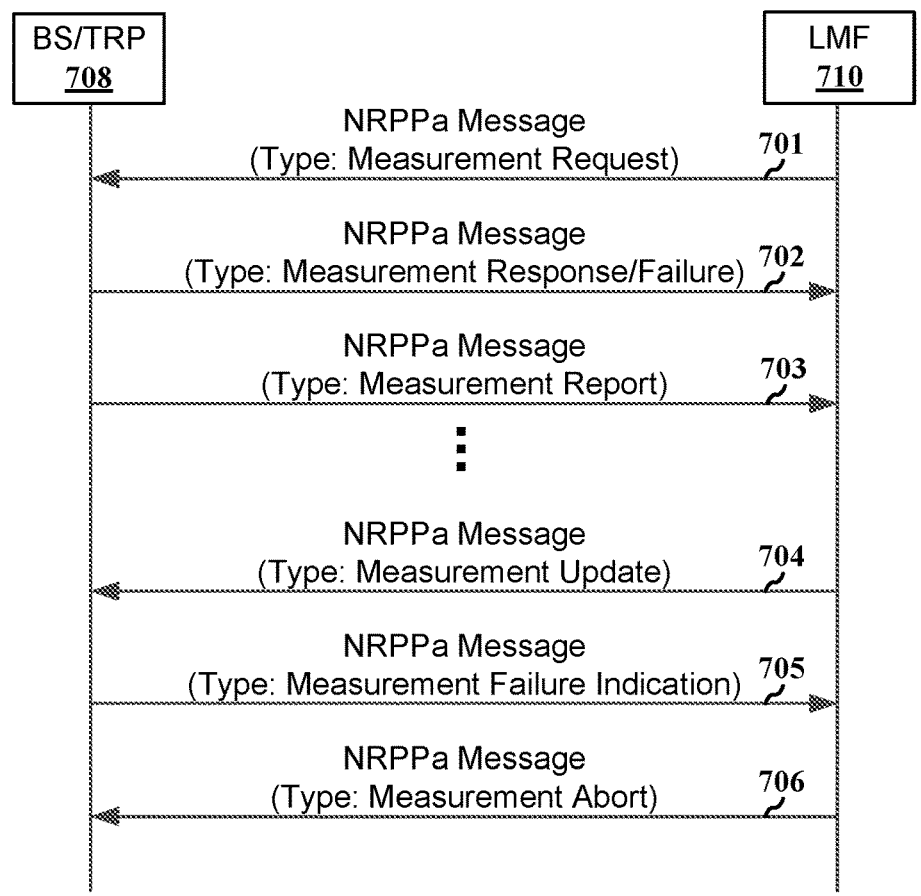
FIG. 7A is a communication flow illustrating an example of an LMF-initiated location information transfer procedure associated with UL time difference of arrival (UL-TDOA) positioning in accordance with various aspects of the present disclosure.
FIG. 7B is diagram illustrating an example of a measurement response message including UL-TDOA measurements in accordance with various aspects of the present disclosure.

FIG. 7A is a communication flow 700A illustrating an example of an LMF-initiated location information transfer procedure associated with UL-TDOA positioning in accordance with various aspects of the present disclosure. The numberings associated with the communication flow 700A do not specify a particular temporal order and are merely used as references for the communication flow 700A. The procedure described herein may enable an LMF to request position measurements from a base station for position calculation of a UE and to provide specified assistance data to the base station.

At 701, an LMF 710 may send a NRPPa message to a selected base station 708 to request UL-TDOA measurement information. The message may include any information specified for the base station 708 to perform the measurements.

At 702, if the report characteristics in 701 is set to "on demand," the base station 708 may obtain the requested UL-TDOA measurements and return them in a measurement response message to the LMF 710. The measurement response message may include the obtained UL-TDOA measurements as shown by a table illustrated in a diagram 700B of FIG. 7B.

If the report characteristics in 701 is set to "periodic," the base station 708 may reply with a measurement response message without including any measurements in the message. The base station 708 then periodically initiates the measurement report procedure in 703 for the UL-TDOA measurements, with the requested reporting periodicity.

If the base station 708 is not able to accept the measurement request message in 701, the base station 708 may return a failure message indicating the cause of the failure.

At 703, the base station 708 may periodically provide the UL-TDOA measurements as shown by the table in the diagram 700B to the LMF 710 if that was requested at 701.

At 704, at any time after 702, the LMF 710 may send a measurement update message to the base station 708 providing updated information specified for the base station 708 to perform the UL-TDOA measurements. Upon receiving the message, the base station 708 may overwrite the previously received measurement configuration information.

At 705, if the previously requested UL-TDOA measurements can no longer be reported, the base station 708 may notify the LMF 710 by sending a measurement failure indication message.

At 706, when the LMF 710 wants to abort an ongoing UL-TDOA measurement it may send a measurement abort message to the base station 708.

Figures 8A, 8B:
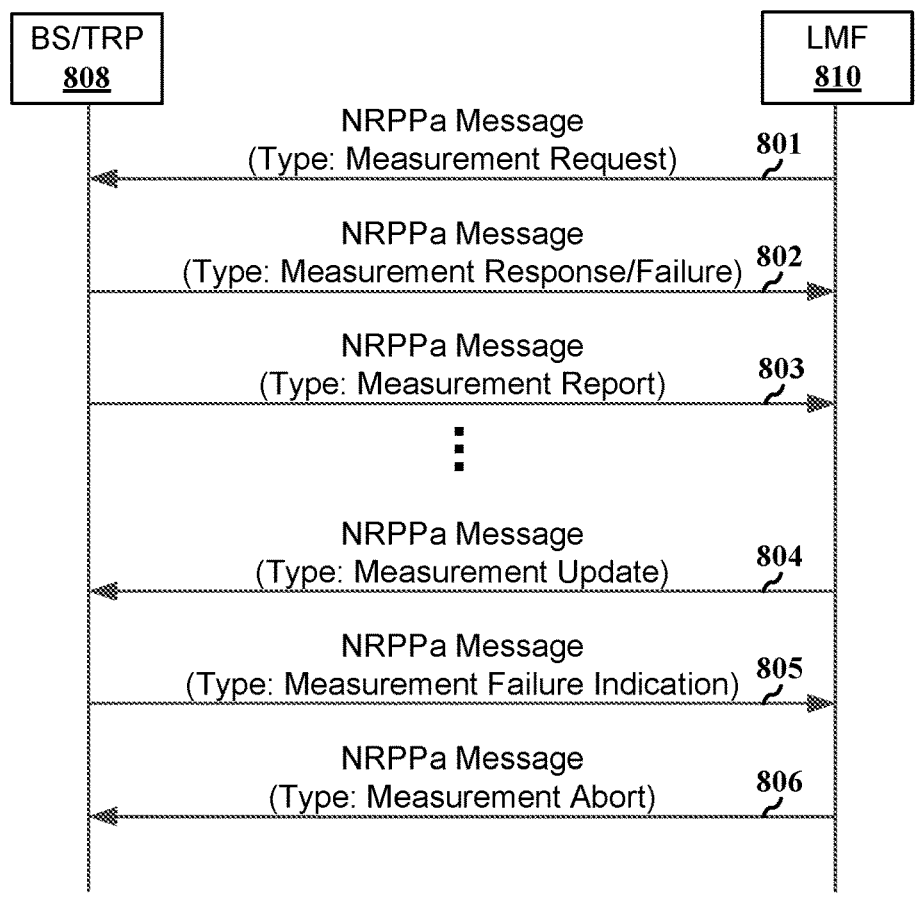
FIG. 8A is a communication flow illustrating an example of an LMF-initiated location information transfer procedure associated with UL angle-of-arrival (UL-AoA) positioning in accordance with various aspects of the present disclosure.
FIG. 8B is diagram illustrating an example of a measurement response message including UL-AoA measurements in accordance with various aspects of the present disclosure.

FIG. 8A is a communication flow 800A illustrating an example of an LMF-initiated location information transfer procedure associated with UL-AOA positioning in accordance with various aspects of the present disclosure. The numberings associated with the communication flow 800A do not specify a particular temporal order and are merely used as references for the communication flow 800A. The procedure described herein may enable an LMF to request position measurements from a base station for position calculation of a UE and to provide specified assistance data to the base station.

At 801, an LMF 810 may send a NRPPa message to a selected base station 808 to request UL-AoA measurement information. The message may include any information specified for the base station 808 to perform the measurements.

At 802, if the report characteristics in 801 is set to "on demand," the base station 808 may obtain the requested UL-AoA measurements and return them in a measurement response message to the LMF 810. The measurement response message may include the obtained UL-AoA measurements as shown by a table illustrated in a diagram 800B of FIG. 8B.

If the report characteristics in 801 is set to "periodic," the base station 808 may reply with a measurement response message without including any measurements in the message. The base station 808 then periodically initiates the measurement report procedure in 803 for the UL-AoA measurements, with the requested reporting periodicity.

If the base station 808 is not able to accept the measurement request message in 801, the base station 808 may return a failure message indicating the cause of the failure.

At 803, the base station 808 may periodically provide the UL-AoA measurements as shown by the table in diagram 800B to the LMF 810 if that was requested at 801.

At 804, at any time after 802, the LMF 810 may send a measurement update message to the base station 808 providing updated information specified for the base station 808 to perform the UL-AoA measurements. Upon receiving the message, the base station 808 may overwrite the previously received measurement configuration information.

At 805, if the previously requested UL-AoA measurements can no longer be reported, the base station 808 may notify the LMF 810 by sending a measurement failure indication message.

At 806, when the LMF 810 wants to abort an ongoing UL-AoA measurement it may send a measurement abort message to the base station 808.

Figures 9A, 9B:
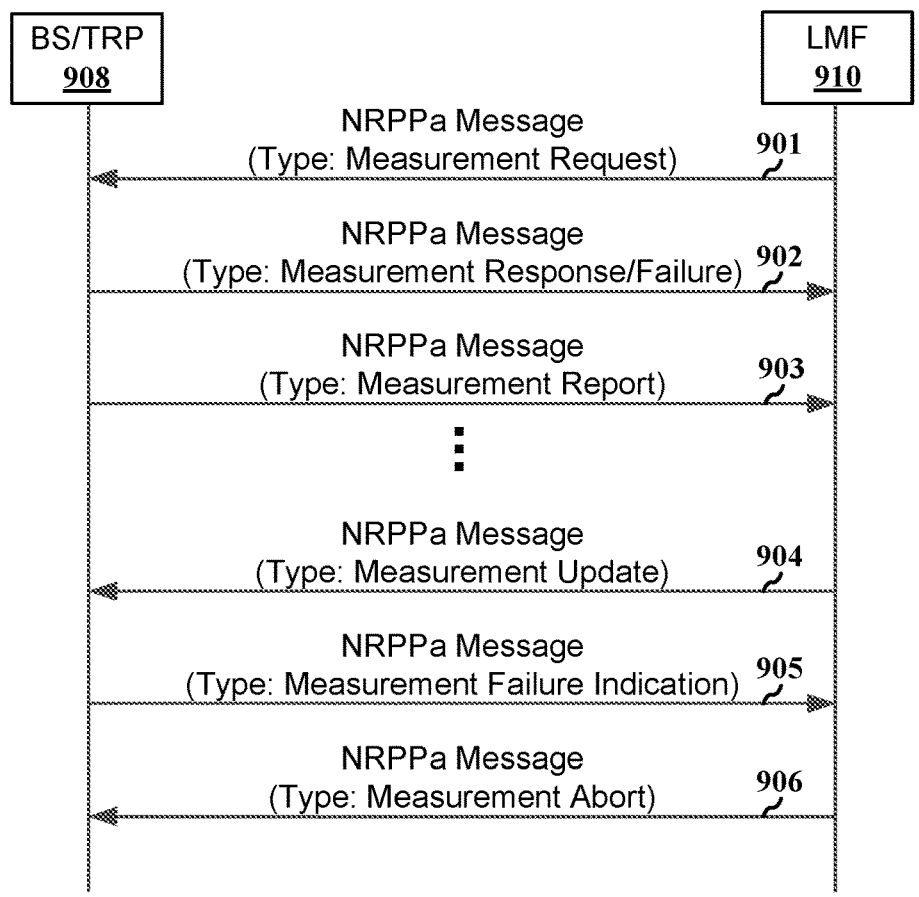
FIG. 9A is a communication flow illustrating an example of an LMF-initiated location information transfer procedure associated with multi-round trip time (multi-RTT) positioning in accordance with various aspects of the present disclosure.
FIG. 9B is diagram illustrating an example of a measurement response message including multi-RTT measurements in accordance with various aspects of the present disclosure.

FIG. 9A is a communication flow 900A illustrating an example of an LMF-initiated location information transfer procedure associated with multi-RTT positioning in accordance with various aspects of the present disclosure. The numberings associated with the communication flow 900A do not specify a particular temporal order and are merely used as references for the communication flow 900A. The procedure described herein may enable an LMF to request position measurements from a base station for position calculation of a UE and to provide specified assistance data to the base station.

At 901, an LMF 910 may send a NRPPa message to a selected base station 908 to request multi-RTT measurement information. The message may include any information specified for the base station 908 to perform the measurements.

At 902, if the report characteristics in 901 is set to "on demand," the base station 908 may obtain the requested multi-RTT measurements and return them in a measurement response message to the LMF 910. The measurement response message may include the obtained multi-RTT measurements as shown by a table illustrated in a diagram 900B of FIG. 9B.

If the report characteristics in 901 is set to "periodic," the base station 908 may reply with a measurement response message without including any measurements in the message. The base station 908 then periodically initiates the measurement report procedure in 903 for the multi-RTT measurements, with the requested reporting periodicity.

If the base station 908 is not able to accept the measurement request message in 901, the base station 908 may return a failure message indicating the cause of the failure.

At 903, the base station 908 may periodically provide the multi-RTT measurements as shown by the table in the diagram 900B to the LMF 910 if that was requested at 901.

At 904, at any time after 902, the LMF 910 may send a measurement update message to the base station 908 providing updated information specified for the base station 908 to perform the multi-RTT measurements. Upon receiving the message, the base station 908 may overwrite the previously received measurement configuration information.

At 905, if the previously requested multi-RTT measurements can no longer be reported, the base station 908 may notify the LMF 910 by sending a measurement failure indication message.

At 906, when the LMF 910 wants to abort an ongoing multi-RTT measurement it may send a measurement abort message to the base station 908.

The speed, bandwidth, latency, and reliability of wireless communications (and network-based positioning) have advanced significantly over last few decades, which also increased the complexity of deploying a wireless network in some instances. To improve the performance of network-based positioning (e.g., as described in connection with FIG. 4) and management of various network nodes and functions, operators and vendors of wireless communication have started to employ artificial intelligence and machine learning (AI/ML) to their services. In one example, AI may be broadly defined as configuring computers/electronics devices to perform tasks regarded as uniquely human. ML may be one category of AI techniques, which include algorithms that are capable of automatically improving their performance without explicit programming.

In some examples, ML algorithms may include supervised learning, unsupervised learning, and/or reinforcement learning. Under the supervised learning, an ML model may specify labelled input and output data during the training phase of the ML. This training data is often labelled by a data scientist in the preparation phase, before being used to train and test the ML model. Once the ML model has learned the relationship between the input and output data, it can be used to classify new and unseen datasets and predict outcomes. Under the unsupervised learning, an ML model may be trained based on raw and unlabeled training data, where the ML model is often used to identify patterns and trends in raw datasets, or to cluster similar data into a specific number of groups. Unsupervised machine learning may be more of a hands-off approach compared to the supervised learning, where the ML model may be configured to process huge arrays of data effectively without human oversight. Under the reinforcement learning, an ML model may be trained based on rewarding suitable behaviors and/or punishing unsuitable behaviors. For example, positive values may be assigned to the suitable actions to encourage the ML model and negative values may be assigned to unsuitable behaviors. This may enable the ML model to seek long-term and maximum overall reward to achieve an optimal solution. ML models are often associated with neural networks (NNs), which may also be known as artificial neural networks (ANNs) or simulated neural networks (SNNs). A neuro network may refer to a computer architecture in which a number of processors are interconnected in a manner suggestive of the connections between neurons in a human brain and which is able to learn by a process of trial and error.

For purposes of the present disclosure, an "inference" or an "ML inference" may refer to a process of running data points into an ML model (e.g., via an inference host) to calculate an output such as a single numerical score, e.g., to use a trained ML algorithm to make a prediction. An "inference host" or an "ML inference host" may refer to a network function which hosts the ML model during an inference mode. On the other hand, a "training" or an "ML training" may refer to a process of running data points to train or teach an ML model (e.g., via a training host). A "training host" or an "ML training host" may refer to a network function which hosts the ML model during a training mode.

Figure 10:
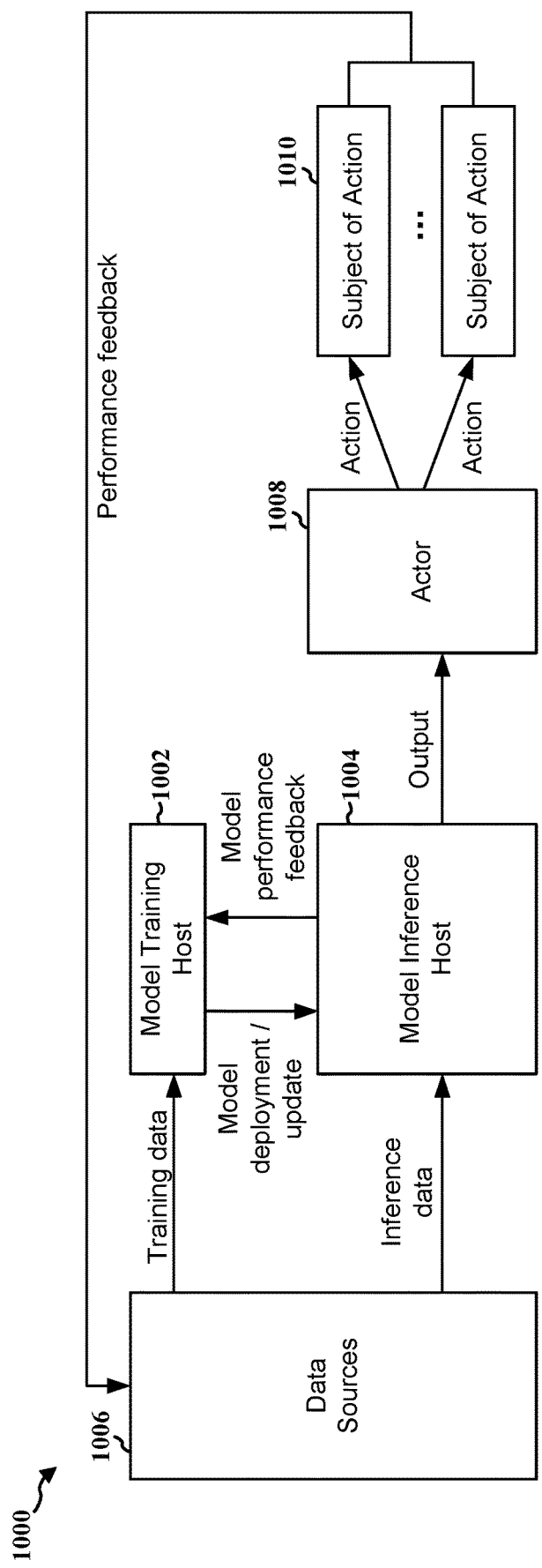
FIG. 10 is a diagram illustrating an example architecture of a functional framework associated with a machine learning (ML) model in accordance with various aspects of the present disclosure.

FIG. 10 is a diagram 1000 illustrating an example architecture of a functional framework associated with an ML model in accordance with various aspects of the present disclosure. In some scenarios, the functional frame work for an ML model may be enabled by further enhancement of data collection through uses cases and/or examples. In one example, as shown by the diagram 1000, a functional framework for the ML model may include multiple logical entities, such as a model training host 1002, a model inference host 1004, data sources 1006, and/or an actor 1008, etc. In some examples, multiple logical entities may be co-located on the same device (e.g., a UE, a positioning device, etc.) or a network node (e.g., a base station, a component of the base station, a server, etc.). In other examples, different logical entities may be located at different devices or network nodes.

The model inference host 1004 may be configured to run an ML model based on inference data provided by the data sources 1006, and the model inference host 1004 may produce an output (e.g., a prediction) with the inference data input to the actor 1008. The actor 1008 may be a device or an entity. For example, the actor 1008 may be a GNSS device or a location server associated with the GNSS device, etc. In addition, the actor 1008 may also depend on the type of tasks performed by the model inference host 1004, type of inference data provided to the model inference host 1004, and/or type of output produced by the model inference host 1004, etc.

After the actor 1008 receives an output from the model inference host 1004, the actor 1008 may determine whether or how to act based on the output. For example, if the actor 1008 is a location server and the output from the model inference host 1004 is associated with PR measurement classification, the actor 1008 may determine how to classify one or more PR measurements performed based on the output. Then, the actor 1008 may indicate the classification to at least one subject of action 1010. In some examples, the actor 1008 and the at least one subject of action 1010 may be the same entity (e.g., the UE).

The data sources 1006 may also be configured for collecting data that is used as training data for training the ML model or as inference data for feeding an ML model inference operation. For example, the data sources 1006 may collect data from one or more UEs, base stations, or location servers, which may include the subject of action 1010, and provide the collected data to the model training host 1002 for ML model training. In some examples, if the output provided by the actor 1008 is inaccurate (or the accuracy is below an accuracy threshold), the model training host 1002 may determine to modify or retrain the ML model used by the model inference host, such as via an ML model deployment/update.

In some scenarios, performing UE positioning with AI/ML may include direct AI/ML positioning and AI/ML assisted positioning. Under the direct AI/ML positioning, the output of an AI/ML model inference may be the UE location. For example, radio frequency (RF) fingerprinting based on channel observation may be used as the input of an AI/ML model, and the output of the AI/ML model may be the position of a UE. Under the AI/ML assisted positioning, the output of an AI/ML model inference may be new measurement and/or enhancement of existing measurement. For example, the output may be line-of-sight (LOS) or non-line-of-sight (NLOS) identification, timing and/or angle of measurement, likelihood of measurement, etc.

Aspects presented herein may improve the performance of UL-based positioning using AI/ML-based techniques. For example, aspects presented herein provide AI/ML-based techniques/measurements which may be configured for one or more positioning entities (e.g., entities that are associated with the positioning of a UE, such as a base station, a TRP, an LMF, and/or the UE itself) to improve existing UL-based positioning mechanisms. The AI/ML techniques/measurements described herein may be applied at the base station or TRP level, and/or based on LMF configuration(s). Aspects presented herein also provide a framework (e.g., an explicit framework) that enables the configuration of AI/ML-based techniques/measurements, and signaling capabilities associated with the AI/ML techniques/measurements from a network node (e.g., a base station) to a location server (e.g., an LMF). In some examples, aspects presented herein may be configured at an LMF, and may be transparent to UEs undergoing UE positioning. In addition, the AI/ML model presented herein may be used in at least two ways. One way is to improve the already specified positioning mechanisms, such as providing better ways for computing already specified measurements such as UL-AoA or UL-RTOA, etc. Another way is to implement the AI/ML model as part of a new/updated positioning mechanism. For example, after a TRP receives a set of SRSs from a UE, the TRP may be configured to run a feature extraction on the received set of SRSs, and the TRP may send the obtained results (e.g., the extracted features) to an LMF for a UE position computation/estimation. In some examples, aspects presented herein.

In one aspect of the present disclosure, a location server, such as an LMF, may configure a set of base stations/TRPs with at least one AI/ML model for performing an UL-based positioning measurement, where the UL-based positioning measurement may include the UL-AoA, the UL-RTOA, the UL-TDOA, multi-RTT, and/or the base station/TRP reception (Rx)-transmission (Tx) (Rx-Tx) time difference positioning, such as described in connection with FIGS. 4 to 9B. Thus, this AI/ML configuration for the set of base stations/TRPs may apply to any of these UL positioning measurements. For purposes of the present disclosure, an UL-based positioning measurement may refer to a measurement performed by a base station or a TRP based on UL reference signal(s) (e.g., SRSs) transmitted from a UE during a positioning session of the UE. For example, to determine the position of a UE, a base station/TRP may measure the UL-AoA, the UL-RTOA, and/or the UL-TDOA for SRSs transmitted from the UE, which may be referred to as performing UL-based positioning measurement(s) for the UE.

In one example, the AI/ML configuration from the LMF may include an AI/ML model identification (ID) in which the set of base stations/TRP may use for the corresponding UL positioning measurement. For example, the LMF may configure a first AI/ML model that is associated with a first AI/ML model ID for a base station for performing UL-AoA positioning measurements, and the LMF may also configure a second AI/ML model that is associated with a second AI/ML model ID for the base station for performing UL-TDOA positioning measurements, etc. When the base station performs the UL-AoA positioning measurements or the UL-TDOA positioning measurements using the corresponding configured AI/ML model, the base station may include the corresponding AI/ML model ID for the AI/ML model used. Then, the LMF may know whether an AI/ML model is used by the base station for an UL positioning measurement, and/or which AI/ML model is used by the base station, etc.

In another example, the AI/ML configuration from the LMF may include a list of resources or resource sets to which an AI/ML model applies. In other words, an AI/ML model may be associated with a specific set of resources (e.g., time and/or frequency resources) in which a UE may use for transmitting SRSs. Thus, if a base station receives SRS from a UE using this specific set of resources, the base station may be configured to apply a corresponding AI/ML model, and report the result (e.g., the inference result) from the AI/ML model to the LMF along with the corresponding AI/ML model ID. Such implementation may be suitable for AI/ML models that are trained/optimized for a specific configuration, reference signals, deployments, and/or environments, etc.

For example, an LMF may configure a base station/TRP to perform UL-AoA positioning for a UE, where the UL-AoA positioning is associated with two positioning frequency layers (PFLs). A PFL (or a "frequency layer" in some examples) may refer to a collection of one or more resource sets across one or more TRPs that may have same values for certain parameters, such as the same subcarrier spacing (SCS) and cyclic prefix (CP) type, the same bandwidth, and/or the same comb-size, etc. As an example, the first positioning frequency layer (PFL) may be associated with SRS resource sets zero (0) and two (2) (which may correspond to SRS resource set IDs 0 and 2, receptively), where the SRS resource set zero may be associated with an AI/ML model with model ID 0004 and the SRS resource set two may not be associated with an AI/ML model. The second PFL may be associated with SRS resource set one (1) (which may correspond to SRS resource set ID 1), and the SRS resource set one may be associated with an AI/ML model with model ID 0002. As such, if a base station/TRP is configured to measure SRS(s) associated with the SRS resource set ID 0, the base station/TRP may measure the SRS(s) with the AI/ML model with model ID 0004, and may report its measurement(s) with the corresponding AI/ML model ID (e.g., 0004). Similarly, if the base station/TRP is configured to measure SRS(s) associated with the SRS resource set ID 1, the base station/TRP may measure the SRS(s) with the AI/ML model with model ID 0002, and may report its measurement(s) with the corresponding AI/ML model ID (e.g., 0002). On the other hand, if the base station/TRP is configured to measure SRS(s) associated with SRS resource set ID 2, the base station/TRP may measure the SRS(s) without using an AI/ML model. In other words, the base station/TRP may measure the SRS(s) based on a classical/default positioning mechanism.

In another example, the AI/ML configuration from the LMF may include one or more conditions under which at least one AI/ML model is to be applied. For example, as a TRP may change the available number of antennas/antenna panels for performing UL measurements, such as due to network energy saving considerations, the AI/ML configuration may specify a minimum number of antennas/antenna panels to be used by a TRP if a corresponding AI/ML model is to be applied at the TRP, or the AI/ML configuration may specify a set of antenna panel configuration to which the AI/ML model applies. In another example, the AI/ML configuration may specify an area identifier (ID) or a geographical area in which at least one AI/ML model is to be applied, or specify a specific set of AI/ML models to be applied at the TRP.

Thus, if a TRP meets the one or more conditions specified in the AI/ML configuration, the TRP may perform UL measurements with the corresponding AI/ML model, and report the UL measurements with the corresponding AI/ML model ID to the LMF. On the other hand, if the TRP does meet the one or more conditions specified in the AI/ML configuration, the TRP may perform UL measurements without using an AI/ML model. In some examples, the LMF may provide the at least one AI/ML model that is to be applied by a base station/TRP directly to the base station/TRP. In other examples, the base station/TRP may retrieved the at least one AI/ML model from a model repository entity in the core network using a universal AI/ML model ID. For example, if a base station/TRP receives an AI/ML configuration from an LMF indicating that an AI/ML model with a universal model ID XYZ is to be used, the base station/TRP may retrieve the corresponding AI/ML model from a server or a database based on the universal model ID XYZ.

In another aspect of the present disclosure, a specific information element (IE) may be included in a measurement request message from an LMF to a base station/TRP (e.g., as described in connection with 701 of FIG. 7A, 801 of FIG. 8A, 901 of FIG. 9A, etc.). In response, the base station/TRP may identify a corresponding AI/ML model to be used for UL measurement(S) based on this specific IE.

FIG. 11 is a diagram 1100 illustrating an example of IEs that may be included in a measurement request message from an LMF to a base station/TRP in accordance with various aspects of the present disclosure. As described in connection with FIGS. 7A, 8A, 9A, an LMF may send a measurement request message to a base station/TRP to request the base station/TRP to configure a positioning measurement.

In one example, as shown at 1102, an IE TRP measurement model ID may be included with the IE TRP measurement type (e.g., AI/ML model IDs 001, 002, 003, . . . N), which may be used for indicating the AI/ML model(s) and/or their corresponding model ID(s) that are to be used for the corresponding UL positioning measurements and reporting.

In another example, or as an alternative, the IE TRP measurement model ID may serve as a resource indicator (RI), which maps to an index in a table of AI/ML-based techniques (e.g., AI/ML models) transmitted as part of positioning assistance data (AD). This may be transmitted/indicated to a UE or broadcast in a positioning-SIB (pos-SIB) message. In addition, an AD associated with AI/ML model(s) (e.g., which may be referred to as "AI/ML model positioning assistance data") may be specified/configured for each of the supported UL-based positioning mechanisms (e.g., UL-TDOA, UL-AoA, multi-RTT, etc.).

In another example, an LMF may determine whether to include this IE TRP measurement model ID in the measurement request message. If this IE TRP measurement model ID is not included in the measurement request message, a base station/TRP may be configured to perform UL-based positioning measurement(s) based on a default behavior (e.g., without using an AI/ML model or using a specific base station technique or a classical technique), or the base station/TRP may be configured to perform UL-based positioning measurement(s) using a default AI/ML model, etc.

In another aspect of the present disclosure, a location server (e.g., an LMF) may be configured to specify one or more AI/ML-based techniques/mechanisms to be used for UL-based positioning, where the specified AI/ML-based technique(s)/mechanism(s) may be new and different from the UL positioning mechanisms described in connection with FIG. 4 or other existing supported UL techniques (e.g., the specified AI/ML-based technique(s)/mechanism(s) may be an update of a supported UL positioning mechanism). For example, an LMF may configure a set of base stations/TRPs to measure SRSs transmitted from a UE, and to perform feature extraction based their SRS measurements. Under AI/ML, feature extraction may refer to a process of transforming raw data into numerical features that may be processed while preserving the information in the original data set. In general, feature extraction may yield better results than applying AI/ML directly to the raw data.

Figure 12:
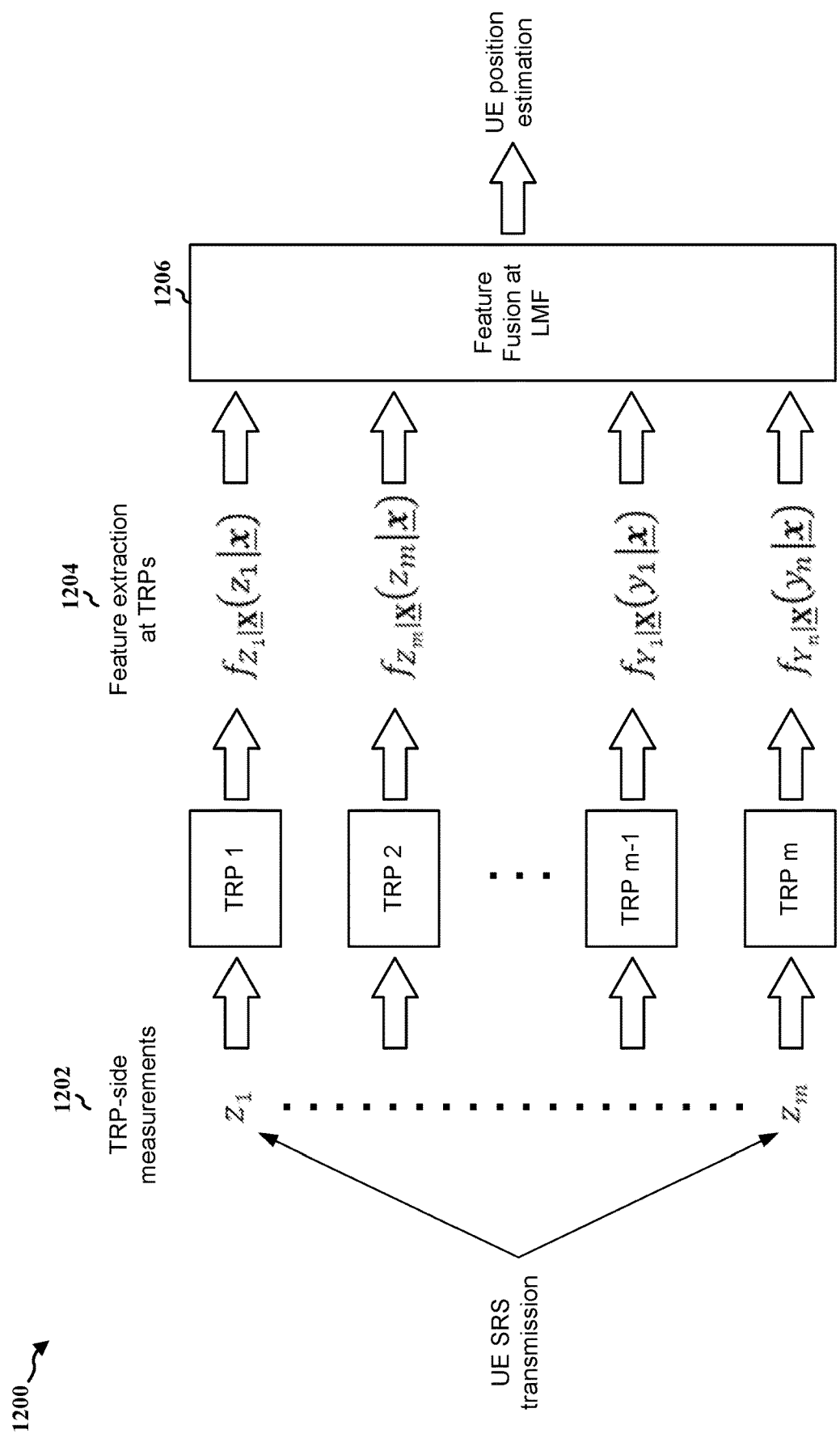
FIG. 12 is a diagram illustrating an example of an LMF configuring a set of TRPs to perform feature extraction for sounding reference signals (SRSs) transmitted from a UE in accordance with various aspects of the present disclosure.

FIG. 12 is a diagram 1200 illustrating an example of an LMF configuring a set of TRPs to perform feature extraction for SRSs transmitted from a UE in accordance with various aspects of the present disclosure. In one example, an LMF (e.g., the LMF 504, 606, 710, 810, 910) may configure at least a feature extractor (e.g., an algorithm for performing feature extraction) and/or an AI/ML model at a set of base stations/TRPs for performing an UL-based positioning measurement (for SRS transmitted from a UE). Then, the output of the feature extractor (which may be referred to as the "extracted feature(s)") may be conveyed to the LMF for feature fusion (e.g., fusing, combining, or aggregating multiple extracted features), where the fused extracted features may be used for determining/estimating the position of a UE (or for assisting the determination/estimation of the UE position).

For example, as shown at 1202, a UE may transmit an SRS to a set of TRPs (e.g., TRP 1 to TRP m) during a UE positioning session (e.g., an occasion/instance in which the position of the UE is to be determined), and the set of TRPs may be configured (by the LMF) to measure the SRS with at least one AI/ML model (which may be referred to as performing an AI/ML-based UL measurement). Based on measuring the SRS, each TRP in the set of TRPs may obtain a measurement Z. For example, a first TRP (TRP 1) may obtain a first measurement $Z_1$, a second TRP (TRP 2) may obtain a second measurement $Z_2$, and a $m^{th}$ TRP (TRP m) may obtain a $m^{th}$ measurement $Z_m$, etc. The AI/ML model used by the set of TRPs may be the same or different. For example, TRP 1 and TRP 2 may be using a first AI/ML model and TRP 3 and TRP 4 may be using a second AI/ML model, or all four TRPs may be using the same AI/ML model.

As shown at 1204, based on the measurement, each TRP (or the AI/ML model used by the TRP) may be configured to perform feature extraction on its measurement. For example, features to be extracted by a TRP may include whether the measurement is based on LOS/NLOS, channel impulse response (CIR), and/or reference signal received power (RSRP), etc. Then, each TRP may transmit its extracted features to the LMF. Also features that may be extracted by a TRP may depend on the AI/ML model used. For example, in a generic framework, one feature may be some latent vector representation that the LMF may take as an input to generate the position of a UE (e.g., the LMF itself may run an AI/ML model which takes features from different TRPs and generate the UE position). Another example of features extracted may include a probability distribution on the angle of arrival, or a probability distribution on the RTOA values measured at a base station/TRP, or a compressed version of the CIR (e.g., the CIR itself may be a huge data and an AI/ML model may compress this huge data in a meaningful useful way).

As shown at 1206, after receiving the extracted features from the set of TRPs, the LMF may combine/fuse/aggregate the received extracted features, and the LMF may use them for determining/estimating the position of the UE or for improving the positioning accuracy of the UE. For example, if the extracted features are associated with LOS/NLOS identification, the LMF may give more weights to measurements from TRPs that are in light-of-sight with the UE compared to TRPs that are not in light-of-sight with the UE. In another example, if the extracted feature is associated with CIR/RSRP measurements, the LMF may aggregate the measurements, compare the aggregated measurements with a database or with measurements of other wireless devices with known locations, and estimate the position of the UE based on the comparison (e.g., devices in a same location are likely to have similar measurements). Such mechanism may also be referred to RF fingerprinting or RF fingerprint-based positioning.

FIG. 13 is a diagram 1300 illustrating an example of IEs that may be included in a measurement request message from an LMF to a base station/TRP in accordance with various aspects of the present disclosure. In one example, as shown at 1302, for an LMF to configure a base station/TRP to perform feature extraction or AI/ML-based UL measurement, a TRP measurement type specific to AI/ML-based UL measurement (e.g., NR-ML-based-UL-Measurement) or a new/updated measurement type may be included in the IE TRP measurement type (e.g., in a measurement request message from an LMF). In addition, the TRP measurement type specific to AI/ML-based UL measurement may be included in the IE TRP measurement type with the IE TRP measurement model ID described in connection with FIG. 11. In other words, this new measurement type may be specified along with a TRP Measurement Model ID IE to specify the AI/ML model(s) to be used for generating the measurement at the TRP.

In another aspect of the present disclosure, a base station/TRP may indicate, to a location server (e.g., an LMF), its capability for supporting AI/ML-based positioning/measurement techniques, where the supporting indication may be indicated for both the AI/ML-based UL positioning and the AI/ML-based enhanced measurements of existing UL-based measurements (e.g., UL-AoA, gNB Rx-Tx, UL-RSTD, etc.). In one example, this supporting indication may be provided separately or granularly per positioning technique (e.g., UL-TDOA, UL-AoA, multi-RTT, etc.), per bandwidth/band, and/or per AI/ML model. In addition, the base station/TRP may also provide a list of AI/ML models or model IDs that is supported by the base station/TRP, either directly to the LMF or as a response to a capability request from the LMF (e.g., the LMF may request whether the TRP supports a list of specific AI/ML models or model IDs, such as via a TRP information request message as described in connection with FIG. 5).

Figure 14:
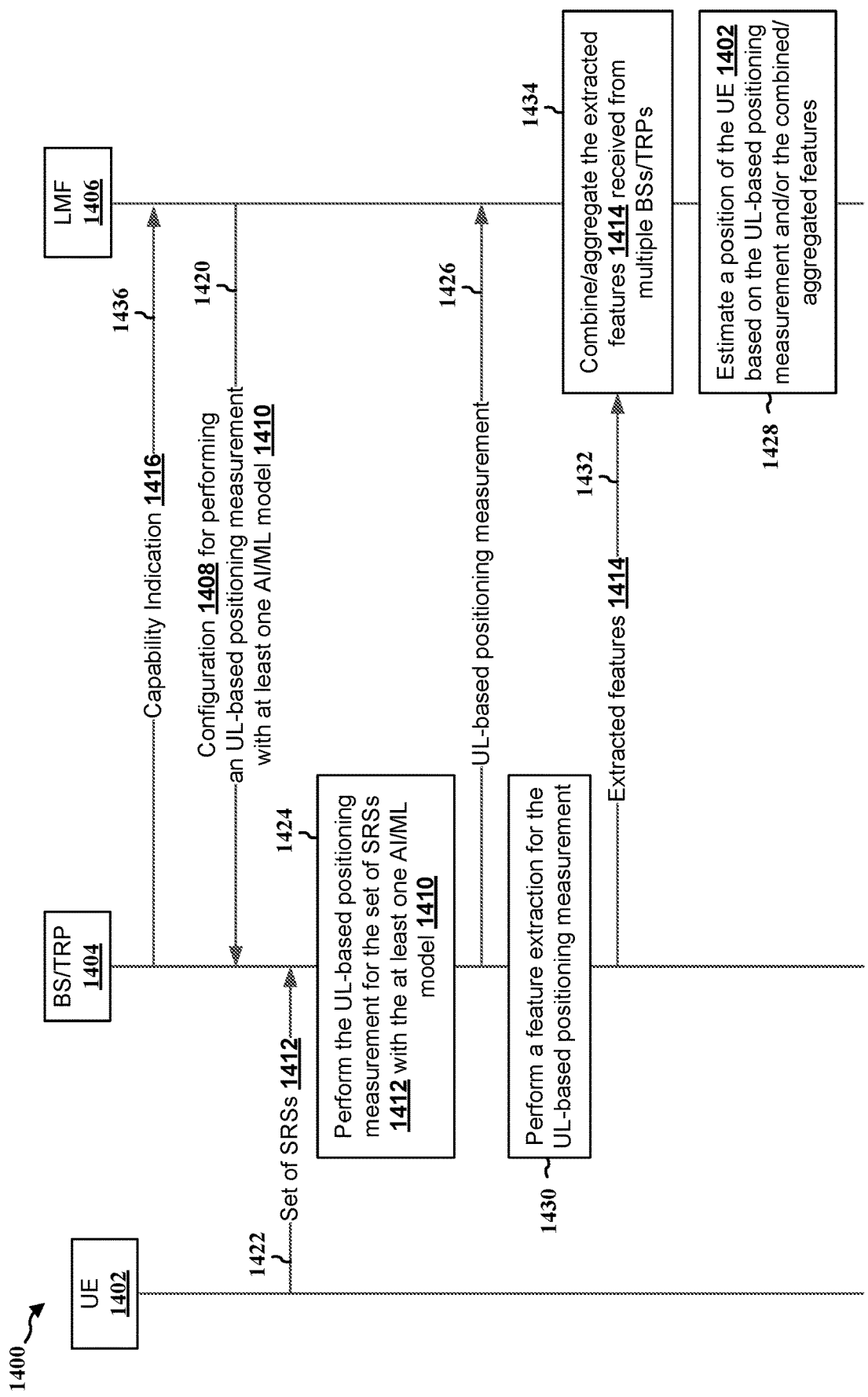
FIG. 14 is a communication flow illustrating an example of a network entity configuring a network node with one or more artificial intelligence (AI)/ML-based techniques/measurements in accordance with various aspects of the present disclosure.

FIG. 14 is a communication flow 1400 illustrating an example of a network entity (e.g., a location server, an LMF, etc.) configuring a network node (e.g., a base station, a TRP, etc.) with one or more AI/ML-based techniques/measurements in accordance with various aspects of the present disclosure. The numberings associated with the communication flow 1400 do not specify a particular temporal order and are merely used as references for the communication flow 1400. Aspects presented herein provide a framework and signaling configurations/capabilities which may enable the network entity to configure AI/ML-based techniques/measurements for a set of network nodes to improve the performance of UL-based positioning.

At 1420, an LMF 1406 (e.g., a network entity) may transmit a configuration 1408 to a base station (BS)/TRP 1404 (e.g., a network node) to configure the BS/TRP 1404 to perform an UL-based positioning measurement with at least one AI/ML model 1410 (e.g., as described in connection with FIG. 10). In one example, each AI/ML model in the at least one AI/ML model 1410 may be associated with a corresponding ML model ID, and the BS/TRP 1404 may use the corresponding ML model ID for the UL-based positioning measurement, such as described in connection with FIG. 11. In addition, the UL-based positioning measurement may be associated with measuring SRS(s) transmitted from a UE 1402 (e.g., for determining the position of the UE). As described in connection with FIGS. 5 to 9B, the UL-based positioning measurement may include UL-RTOA measurement, Rx-Tx time difference measurement, and/or UL-AoA measurement, etc. In some examples, the configuration 1408 may also include a list of resources or resource sets associated with the at least one ML model 1410. In other examples, the configuration 1408 may include one or more conditions in which the at least one ML model 1410 is to be applied by the BS/TRP 1404. For example, the one or more conditions include at least one of: an availability of a number of available antenna panels, a match with an area ID, or an existence of an antenna panel configuration that supports the at least one ML model.

In one example, as described in connection with FIGS. 7A, 8A, and 9A, the LMF 1406 may transmit the configuration 1408 to the BS/TRP 1404 via a measurement request message, where the corresponding ML model ID for each of the at least one ML model is an IE of the measurement request message.

At 1422, the BS/TRP 1404 may receive a set of SRSs 1412 from the UE 1402. Then, at 1424, based on the configuration 1408 received from the LMF 1406, the BS/TRP 1404 may perform the UL-based positioning measurement for the set of SRSs 1412 with the at least one AI/ML model 1410. In some examples, if the configuration 1408 is not associated with at least one AI/ML model 1410 or does not include the corresponding ML model ID, the BS/TRP 1404 may be configured to perform a default behavior, such as measuring the set of SRSs 1412 without using any AI/ML model or measuring the set of SRSs 1412 using a default AI/ML model.

In one example, if the at least one AI/ML model 1410 is not available at the BS/TRP 1404, the LMF 1406 may transmit the at least one AI/ML model 1410 to the BS/TRP 1404. In another example, the BS/TRP 1404 may obtain the at least one AI/ML model 1410 from a model repository entity in a core network based on the corresponding ML model ID or a universal ML model ID associated with the at least one ML model.

At 1426, the BS/TRP 1404 may transmit the UL-based positioning measurement(s) for the set of SRSs 1412 to the LMF 1406.

At 1428, based on the UL-based positioning measurement(s) for the set of SRSs 1412, the LMF 1406 may estimate a position of the UE 1402 (e.g., based on using an UL-based positioning mechanism/technique).

In one example, the configuration 1408 may further configure the BS/TRP 1404 to perform a feature extraction for the UL-based positioning measurement(s). In response, at 1430, the BS/TRP 1404 may perform the feature extraction for the UL-based positioning measurement(s) to extract a set of features 1414 from the UL-based positioning measurement(s). Then, at 1432, the BS/TRP 1404 may transmit the set of features 1414 to the LMF 1406. In one example, the feature extraction may be associated with at least one supported UL-based positioning measurement (e.g., as described in connection with FIG. 4) or at least one updated/new UL-based positioning measurement (e.g., the AI.ML-based UL positioning).

At 1434, the LMF 1406 may receive feature extractions from multiple BS s/TRPs including the set of extracted features 1414 from the BS/TRP 1404. Then, the LMF 1406 may combine/aggregate/fuse feature extractions from multiple BS s/TRPs to obtain a combined feature, such as described in connection with FIG. 12. Then, at 1428, the LMF 1406 may estimate the position of the UE 1402 further based on the combined feature.

In another example, as shown at 1436, the BS/TRP 1404 may transmit a capability indication 1416 to the LMF 1406, where the capability indication 1416 may indicate the BS/TRP 1404's capability to support the UL-based positioning measurement with the at least one ML model 1410. Then, at 1420, the LMF 1406 may transmit the configuration 1408 based on the capability indication 1416 (e.g., the capability indication meets the specifications for performing the UL-based positioning measurement with at least one AI/ML model 1410). In some examples, the BS/TRP 1404 may transmit this capability indication 1416 to the LMF 1406 separately per positioning technique associated with the UL-based positioning measurement, per bandwidth used for the UL-based positioning measurement, or per ML model ID, etc.

Figure 15:
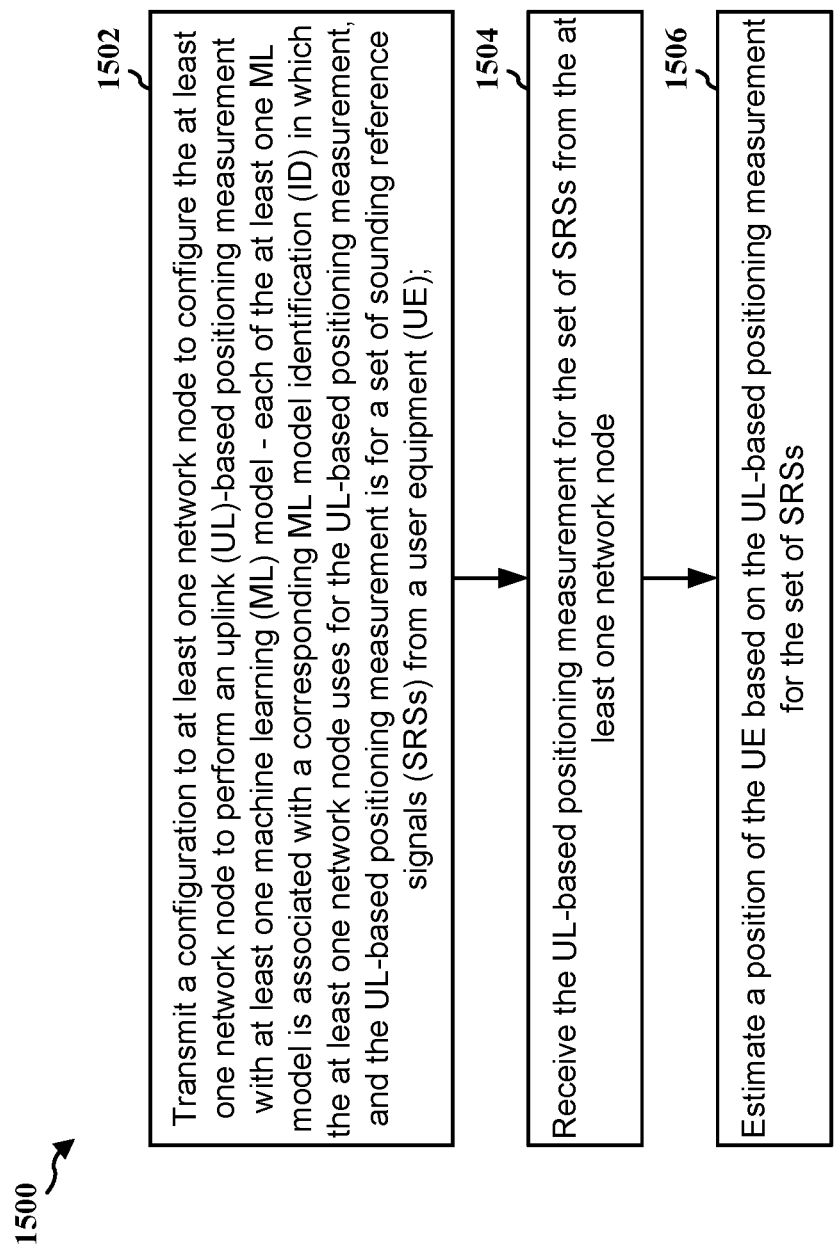
FIG. 15 is a flowchart of a method of wireless communication.

FIG. 15 is a flowchart 1500 of a method of wireless communication. The method may be performed by a network entity (e.g., the LMF 166, 504, 606, 710, 810, 910, 1406; the network entity 1660). The method may enable the network entity to configure AI/ML-based techniques/measurements for a set of network nodes to improve the performance of UL-based positioning.

At 1502, the network entity may transmit a configuration to at least one network node to configure the at least one network node to perform an UL-based positioning measurement with at least one ML model, where each of the at least one ML model is associated with a corresponding ML model ID in which the at least one network node uses for the UL-based positioning measurement, where the UL-based positioning measurement is for a set of SRSs from a UE, such as described in connection with FIGS. 5 to 9B and 14. For example, at 1420 of FIG. 14, the LMF 1406 may transmit, to the BS/TRP 1404, a configuration 1408 for performing an UL-based positioning measurement with at least one AI/ML model 1410. Each AI/ML model in the at least one AI/ML model 1410 may be associated with a corresponding AI/ML model ID, and the UL-based positioning measurement is for measuring a set of SRSs 1412 from the UE 1402. The transmission of the configuration may be performed by, e.g., the AI/ML-based positioning configuration component 197, the network processor 1612, and/or the network interface 1680 of the network entity 1660 in FIG. 16.

At 1504, the network entity may receive the UL-based positioning measurement for the set of SRSs from the at least one network node, such as described in connection with FIGS. 12 and 14. For example, at 1426 of FIG. 14, the LMF 1406 may receive the UL-based positioning measurement for the set of SRSs 1412 from the BS/TRP 1404. The reception of the UL-based positioning measurement may be performed by, e.g., the AI/ML-based positioning configuration component 197, the network processor 1612, and/or the network interface 1680 of the network entity 1660 in FIG. 16.

At 1506, the network entity may estimate a position of the UE based on the UL-based positioning measurement for the set of SRSs, such as described in connection with FIGS. 12 and 14. For example, at 1428 of FIG. 14, the LMF 1406 may estimate a position of the UE 1402 based on the UL-based positioning measurement for the set of SRSs 1412. The transmission of the configuration may be performed by, e.g., the AI/ML-based positioning configuration component 197, the network processor 1612, and/or the network interface 1680 of the network entity 1660 in FIG. 16.

In one example, the configuration may further configure the at least one network node to perform a feature extraction for the UL-based positioning measurement. In such an example, the network entity may receive a set of feature extractions for the UL-based positioning measurement from the at least one network node, and the network entity may combine the set of feature extractions, where the position of the UE may be estimated further based on the combined set of feature extractions. In such an example, the set of feature extractions may be associated with at least one supported UL-based positioning measurement or at least one updated UL-based positioning measurement.

In another example, the network entity may receive an indication from the at least one network node for a capability to support the UL-based positioning measurement with the at least one ML model, where the configuration may be transmitted to the at least one network node based on the indication. In such an example, the indication may be received from the at least one network node separately per positioning technique associated with the UL-based positioning measurement, per bandwidth used for the UL-based positioning measurement, or per ML model ID.

In another example, the configuration may be transmitted in a measurement request message, and where the corresponding ML model ID for each of the at least one ML model is an IE of the measurement request message.

In another example, the UL-based positioning measurement may correspond to a default behavior if the UL-based positioning measurement is not associated with the at least one ML model or the corresponding ML model ID.

In another example, the UL-based positioning measurement may include: RTOA measurement, Rx-Tx time difference measurement, AoA measurement, or a combination thereof.

In another example, the configuration may include a list of resources or resource sets associated with the at least one ML model.

In another example, the configuration may include one or more conditions in which the at least one ML model is to be applied by the at least one network node. In such an example, the one or more conditions include at least one of: an availability of a number of available antenna panels, a match with an area ID, or an existence of an antenna panel configuration that supports the at least one ML model.

In another example, the network entity may transmit the at least one ML model to the at least one network node.

In another example, the network entity may be a location server or an LMF and the at least one network node may include a base station, a component of the base station, a TRP, or a combination thereof.

Figure 16:
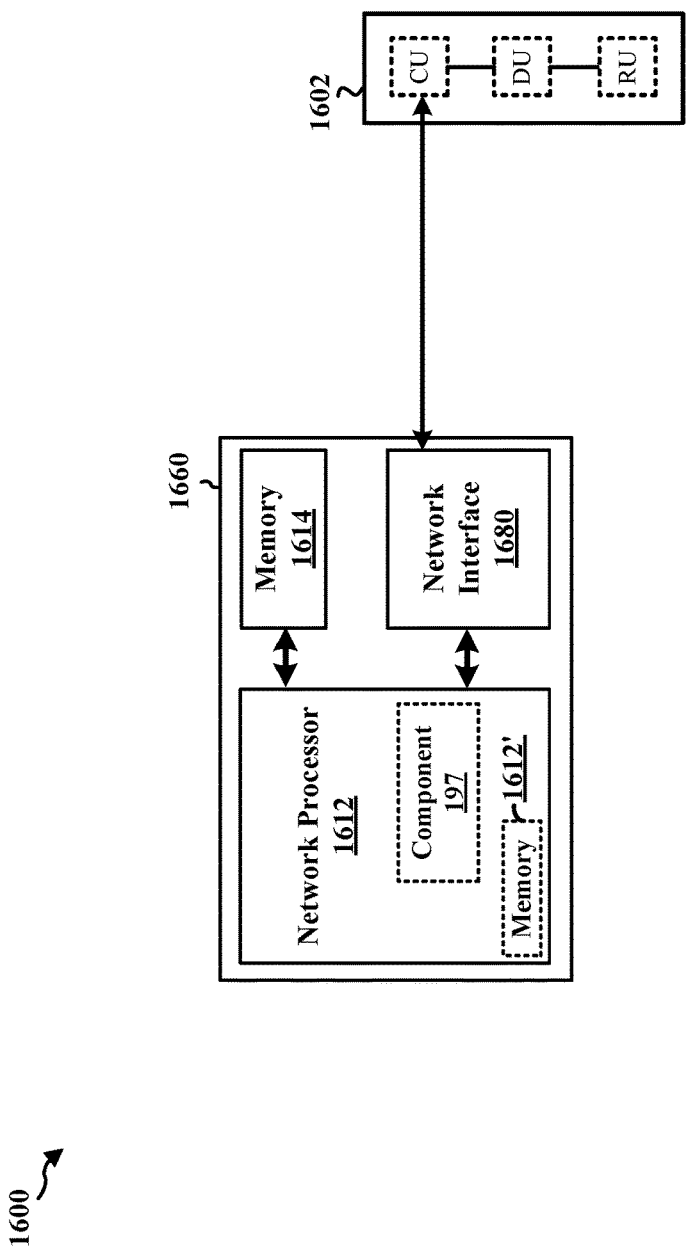
FIG. 16 is a diagram illustrating an example of a hardware implementation for a network entity.

FIG. 16 is a diagram 1600 illustrating an example of a hardware implementation for a network entity 1660. In one example, the network entity 1660 may be within the core network 120. The network entity 1660 may include a network processor 1612. The network processor 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/memory. Each computer-readable medium/memory may be non-transitory. The processor 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the AI/ML-based positioning configuration component 197 is configured to transmit a configuration to at least one network node to configure the at least one network node to perform an UL-based positioning measurement with at least one ML model, where each of the at least one ML model is associated with a corresponding ML model ID in which the at least one network node uses for the UL-based positioning measurement, where the UL-based positioning measurement is for a set of SRSs from a UE. The AI/ML-based positioning configuration component 197 may also be configured to receive the UL-based positioning measurement for the set of SRSs from the at least one network node. The AI/ML-based positioning configuration component 197 may also be configured to estimate a position of the UE based on the UL-based positioning measurement for the set of SRSs. The AI/ML-based positioning configuration component 197 may be within the processor 1612. The AI/ML-based positioning configuration component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1660 may include a variety of components configured for various functions. In one configuration, the network entity 1660 includes means for transmitting a configuration to at least one network node to configure the at least one network node to perform an UL-based positioning measurement with at least one ML model, where each of the at least one ML model is associated with a corresponding ML model ID in which the at least one network node uses for the UL-based positioning measurement, where the UL-based positioning measurement is for a set of SRSs from a UE. The network entity 1660 may further include means for receiving the UL-based positioning measurement for the set of SRSs from the at least one network node. The network entity 1660 may further include means for estimating a position of the UE based on the UL-based positioning measurement for the set of SRSs.

In one example, the configuration may further configure the at least one network node to perform a feature extraction for the UL-based positioning measurement. In such an example, the network entity 1660 may further include means for receiving a set of feature extractions for the UL-based positioning measurement from the at least one network node, and means for combining the set of feature extractions, where the position of the UE may be estimated further based on the combined set of feature extractions. In such an example, the set of feature extractions may be associated with at least one supported UL-based positioning measurement or at least one updated UL-based positioning measurement.

In another example, the network entity 1660 may further include means for receiving an indication from the at least one network node for a capability to support the UL-based positioning measurement with the at least one ML model, where the configuration may be transmitted to the at least one network node based on the indication. In such an example, the indication may be received from the at least one network node separately per positioning technique associated with the UL-based positioning measurement, per bandwidth used for the UL-based positioning measurement, or per ML model ID.

In another example, the configuration may be transmitted in a measurement request message, and where the corresponding ML model ID for each of the at least one ML model is an IE of the measurement request message.

In another example, the UL-based positioning measurement may correspond to a default behavior if the UL-based positioning measurement is not associated with the at least one ML model or the corresponding ML model ID.

In another example, the UL-based positioning measurement may include: RTOA measurement, Rx-Tx time difference measurement, AoA measurement, or a combination thereof.

In another example, the configuration may include a list of resources or resource sets associated with the at least one ML model.

In another example, the configuration may include one or more conditions in which the at least one ML model is to be applied by the at least one network node. In such an example, the one or more conditions include at least one of: an availability of a number of available antenna panels, a match with an area ID, or an existence of an antenna panel configuration that supports the at least one ML model.

In another example, the network entity 1660 may further include means for transmitting the at least one ML model to the at least one network node.

In another example, the network entity may be a location server or an LMF and the at least one network node may include a base station, a component of the base station, a TRP, or a combination thereof.

The means may be the AI/ML-based positioning configuration component 197 of the network entity 1660 configured to perform the functions recited by the means.

Figure 17:
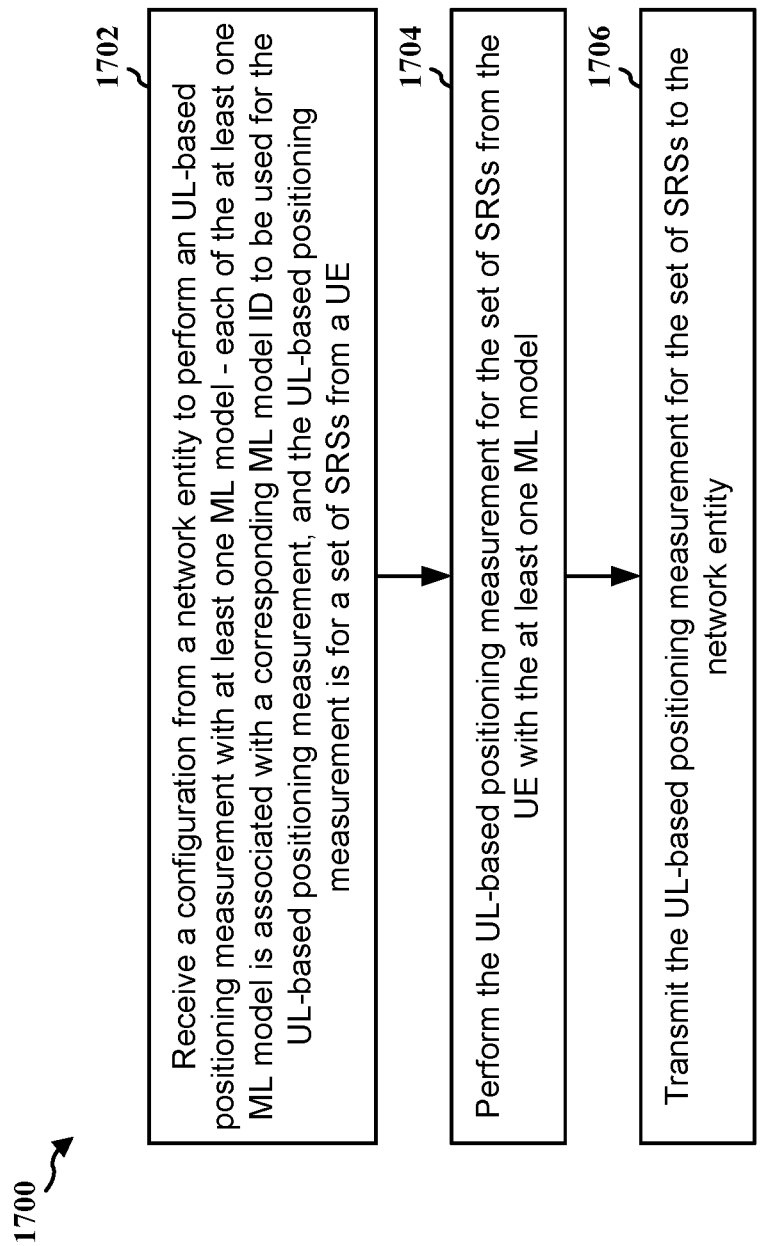
FIG. 17 is a flowchart of a method of wireless communication.

FIG. 17 is a flowchart 1700 of a method of wireless communication. The method may be performed by a network node (e.g., the base station 102, 502, 708, 808, 908; the serving base station 604; the one or more neighboring base stations 608; the BS/TRP 1404; the network entity 1802). The method may enable the network node to be configured to perform AI/ML-based techniques/measurements to improve the performance of UL-based positioning.

At 1702, the network node may receive a configuration from a network entity to perform an UL-based positioning measurement with at least one ML model, where each of the at least one ML model is associated with a corresponding ML model ID to be used for the UL-based positioning measurement, where the UL-based positioning measurement is for a set of SRSs from a UE, such as described in connection with FIGS. 5 to 9B and 14. For example, at 1420 of FIG. 14, the BS/TRP 1404 may receive a configuration 1408 from the LMF 1406 for performing an UL-based positioning measurement with at least one AI/ML model 1410. Each AI/ML model in the at least one AI/ML model 1410 may be associated with a corresponding AI/ML model ID, and the UL-based positioning measurement is for measuring a set of SRSs 1412 from the UE 1402. The reception of the configuration may be performed by, e.g., the AI/ML-based positioning component 199 and/or the communication interface 1818, 1838, and/or 1848 of the network entity 1802 in FIG. 18.

At 1704, the network node may perform the UL-based positioning measurement for the set of SRSs from the UE with the at least one ML model, such as described in connection with FIGS. 12 and 14. For example, at 1424 of FIG. 14, the BS/TRP 1404 may perform the UL-based positioning measurement for the set of SRSs 1412 with the at least one AI/ML model 1410. The UL-based positioning measurement may be performed by, e.g., the AI/ML-based positioning component 199 and/or the communication interface 1818, 1838, and/or 1848 of the network entity 1802 in FIG. 18.

At 1706, the network node may transmit the UL-based positioning measurement for the set of SRSs to the network entity, such as described in connection with FIGS. 12 and 14. For example, at 1426 of FIG. 14, the BS/TRP 1404 may transmit the UL-based positioning measurement for the set of SRSs 1412 to the LMF 1406. The reception of the configuration may be performed by, e.g., the AI/ML-based positioning component 199 and/or the communication interface 1818, 1838, and/or 1848 of the network entity 1802 in FIG. 18.

In one example, the configuration may further configure the network node to perform a feature extraction for the UL-based positioning measurement. In such an example, the network node may extract at least one feature from the UL-based positioning measurement, and the network node may transmit the at least one feature to the network entity. In such an example, the feature extraction for the UL-based positioning measurement may be associated with at least one supported UL-based positioning measurement or at least one updated UL-based positioning measurement.

In another example, the network node may transmit an indication to the network entity for a capability to support the UL-based positioning measurement with the at least one ML model, where the configuration is received from the network entity based on the indication. In such an example, the indication may be transmitted to the network entity separately per positioning technique associated with the UL-based positioning measurement, per bandwidth used for the UL-based positioning measurement, or per ML model ID.

In another example, the configuration may be received in a measurement request message, and where the corresponding ML model ID for each of the at least one ML model is an IE of the measurement request message.

In another example, the network node may perform the UL-based positioning measurement with a default behavior if the UL-based positioning measurement is not associated with the at least one ML model or the corresponding ML model ID.

In another example, the UL-based measurement may include: RTOA measurement, Rx-Tx time difference measurement, AoA measurement, or a combination thereof.

In another example, the configuration may include a list of resources or resource sets associated with the at least one ML model.

In another example, the configuration may include one or more conditions in which the at least one ML model is to be applied by the network node. In such an example, the one or more conditions may include at least one of: an availability of a number of available antenna panels, a match with an area ID, or an existence of an antenna panel configuration that supports the at least one ML model.

In another example, the network node may receive the at least one ML model from the network entity, or from a model repository entity in a core network based on the corresponding ML model ID or a universal ML model ID associated with the at least one ML model.

In another example, the network node is a base station, a component of the base station, or a TRP, and the network entity is a location server or an LMF.

Figure 18:
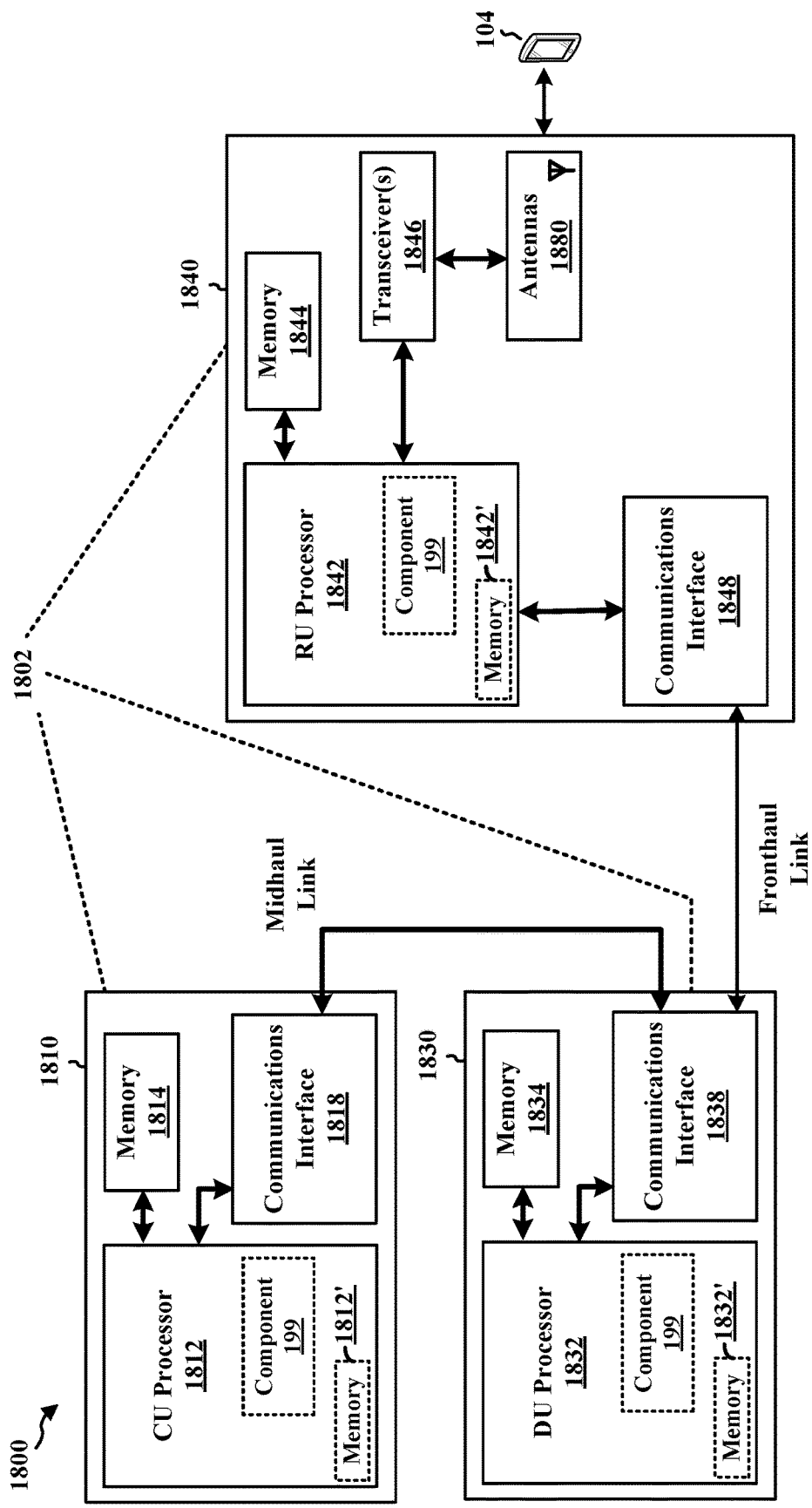
FIG. 18 is a diagram illustrating an example of a hardware implementation for a network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the AI/ML-based positioning component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the AI/ML-based positioning component 199 is configured to receive a configuration from a network entity to perform an UL-based positioning measurement with at least one ML model, where each of the at least one ML model is associated with a corresponding ML model ID to be used for the UL-based positioning measurement, where the UL-based positioning measurement is for a set of SRSs from a UE. The AI/ML-based positioning component 199 may also be configured to perform the UL-based positioning measurement for the set of SRSs from the UE with the at least one ML model. The AI/ML-based positioning component 199 may also be configured to transmit the UL-based positioning measurement for the set of SRSs to the network entity. The AI/ML-based positioning component 199 may be within one or more processors of one or more of the CU 1810, DU 1830, and the RU 1840. The AI/ML-based positioning component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 includes means for receiving a configuration from a network entity to perform an UL-based positioning measurement with at least one ML model, where each of the at least one ML model is associated with a corresponding ML model ID to be used for the UL-based positioning measurement, where the UL-based positioning measurement is for a set of SRSs from a UE. The network entity 1802 may further include means for performing the UL-based positioning measurement for the set of SRSs from the UE with the at least one ML model. The network entity 1802 may further include means for transmitting the UL-based positioning measurement for the set of SRSs to the network entity.

In one example, the configuration may further configure the network node to perform a feature extraction for the UL-based positioning measurement. In such an example, the network entity 1802 may further include means for extracting at least one feature from the UL-based positioning measurement, and means for transmitting the at least one feature to the network entity. In such an example, the feature extraction for the UL-based positioning measurement may be associated with at least one supported UL-based positioning measurement or at least one updated UL-based positioning measurement.

In another example, the network entity 1802 may further include means for transmitting an indication to the network entity for a capability to support the UL-based positioning measurement with the at least one ML model, where the configuration is received from the network entity based on the indication. In such an example, the indication may be transmitted to the network entity separately per positioning technique associated with the UL-based positioning measurement, per bandwidth used for the UL-based positioning measurement, or per ML model ID.

In another example, the configuration may be received in a measurement request message, and where the corresponding ML model ID for each of the at least one ML model is an IE of the measurement request message.

In another example, the network entity 1802 may further include means for performing the UL-based positioning measurement with a default behavior if the UL-based positioning measurement is not associated with the at least one ML model or the corresponding ML model ID.

In another example, the UL-based measurement may include: RTOA measurement, Rx-Tx time difference measurement, AoA measurement, or a combination thereof.

In another example, the configuration may include a list of resources or resource sets associated with the at least one ML model.

In another example, the configuration may include one or more conditions in which the at least one ML model is to be applied by the network node. In such an example, the one or more conditions may include at least one of: an availability of a number of available antenna panels, a match with an area ID, or an existence of an antenna panel configuration that supports the at least one ML model.

In another example, the network entity 1802 may further include means for receiving the at least one ML model from the network entity, or from a model repository entity in a core network based on the corresponding ML model ID or a universal ML model ID associated with the at least one ML model.

In another example, the network node is a base station, a component of the base station, or a TRP, and the network entity is a location server or an LMF.

The means may be the AI/ML-based positioning component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, including: transmitting a configuration to at least one network node to configure the at least one network node to perform an UL-based positioning measurement with at least one ML model, where each of the at least one ML model is associated with a corresponding ML model ID in which the at least one network node uses for the UL-based positioning measurement, where the UL-based positioning measurement is for a set of SRSs from a UE; receiving the UL-based positioning measurement for the set of SRSs from the at least one network node; and estimating a position of the UE based on the UL-based positioning measurement for the set of SRSs.

Aspect 2 is the method of aspect 1, where the configuration further configures the at least one network node to perform a feature extraction for the UL-based positioning measurement, the method further including: receiving a set of feature extractions for the UL-based positioning measurement from the at least one network node; and combining the set of feature extractions, where the position of the UE is estimated further based on the combined set of feature extractions.

Aspect 3 is the method of aspect 2, where the set of feature extractions is associated with at least one supported UL-based positioning measurement or at least one updated UL-based positioning measurement.

Aspect 4 is the method of any of aspects 1 to 3, further including: receiving an indication from the at least one network node for a capability to support the UL-based positioning measurement with the at least one ML model, where the configuration is transmitted to the at least one network node based on the indication.

Aspect 5 is the method of aspect 4, where the indication is received from the at least one network node separately per positioning technique associated with the UL-based positioning measurement, per bandwidth used for the UL-based positioning measurement, or per ML model ID.

Aspect 6 is the method any of aspects 1 to 5, where the configuration is transmitted in a measurement request message, and where the corresponding ML model ID for each of the at least one ML model is an IE of the measurement request message.

Aspect 7 is the method of any of aspects 1 to 6, where the UL-based positioning measurement corresponds to a default behavior if the UL-based positioning measurement is not associated with the at least one ML model or the corresponding ML model ID.

Aspect 8 is the method of any of aspects 1 to 7, where the UL-based positioning measurement includes: RTOA measurement, Rx-Tx time difference measurement, AoA measurement, or a combination thereof.

Aspect 9 is the method of any of aspects 1 to 8, where the configuration includes a list of resources or resource sets associated with the at least one ML model.

Aspect 10 is the method of any of aspects 1 to 9, where the configuration includes one or more conditions in which the at least one ML model is to be applied by the at least one network node.

Aspect 11 is the method of aspect 10, where the one or more conditions include at least one of: an availability of a number of available antenna panels, a match with an area ID, or an existence of an antenna panel configuration that supports the at least one ML model.

Aspect 12 is the method of any of aspects 1 to 11, further including: transmitting the at least one ML model to the at least one network node.

Aspect 13 is the method of any of aspects 1 to 12, where the network entity is a location server or an LMF and the at least one network node includes a base station, a component of the base station, a TRP, or a combination thereof.

Aspect 14 is an apparatus for wireless communication at a network entity, including: a memory; and at least one processor coupled to the memory and, based at least in part on information stored in the memory, the at least one processor is configured to implement any of aspects 1 to 13.

Aspect 15 is the apparatus of aspect 14, further including at least one of a transceiver or an antenna coupled to the at least one processor.

Aspect 16 is an apparatus for wireless communication including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

Aspect 18 is a method of wireless communication at a network node, including: receiving a configuration from a network entity to perform an UL-based positioning measurement with at least one ML model, where each of the at least one ML model is associated with a corresponding ML model ID to be used for the UL-based positioning measurement, where the UL-based positioning measurement is for a set of SRSs from a UE; performing the UL-based positioning measurement for the set of SRSs from the UE with the at least one ML model; and transmitting the UL-based positioning measurement for the set of SRSs to the network entity.

Aspect 19 is the method of aspect 18, where the configuration further configures the network node to perform a feature extraction for the UL-based positioning measurement, the method further including: extracting at least one feature from the UL-based positioning measurement; and transmitting the at least one feature to the network entity.

Aspect 20 is the method of aspect 19, where the feature extraction for the UL-based positioning measurement is associated with at least one supported UL-based positioning measurement or at least one updated UL-based positioning measurement.

Aspect 21 is the method of any of aspects 18 to 20, further including: transmitting an indication to the network entity for a capability to support the UL-based positioning measurement with the at least one ML model, where the configuration is received from the network entity based on the indication.

Aspect 22 is the method of aspect 21, where the indication is transmitted to the network entity separately per positioning technique associated with the UL-based positioning measurement, per bandwidth used for the UL-based positioning measurement, or per ML model ID.

Aspect 23 is the method of any of aspects 18 to 22, where the configuration is received in a measurement request message, and where the corresponding ML model ID for each of the at least one ML model is an IE of the measurement request message.

Aspect 24 is the method of any of aspects 18 to 23, further including: performing the UL-based positioning measurement with a default behavior if the UL-based positioning measurement is not associated with the at least one ML model or the corresponding ML model ID.

Aspect 25 is the method of any of aspects 18 to 24, where the UL-based measurement includes: RTOA measurement, Rx-Tx time difference measurement, AoA measurement, or a combination thereof.

Aspect 26 is the method of any of aspects 18 to 25, where the configuration includes a list of resources or resource sets associated with the at least one ML model.

Aspect 27 is the method of any of aspects 18 to 26, where the configuration includes one or more conditions in which the at least one ML model is to be applied by the network node.

Aspect 28 is the method of aspect 27, where the one or more conditions include at least one of: an availability of a number of available antenna panels, a match with an area ID, or an existence of an antenna panel configuration that supports the at least one ML model.

Aspect 29 is the method of any of aspects 18 to 28, further including: receiving the at least one ML model from the network entity, or from a model repository entity in a core network based on the corresponding ML model ID or a universal ML model ID associated with the at least one ML model.

Aspect 30 is the method of any of aspects 18 to 29, where the network entity is a location server or an LMF and the at least one network node includes a base station, a component of the base station, a TRP, or a combination thereof.

Aspect 31 is an apparatus for wireless communication at a network node, including: a memory; and at least one processor coupled to the memory and, based at least in part on information stored in the memory, the at least one processor is configured to implement any of aspects 18 to 30.

Aspect 32 is the apparatus of aspect 31, further including at least one of a transceiver or an antenna coupled to the at least one processor.

Aspect 33 is an apparatus for wireless communication including means for implementing any of aspects 18 to 30.

Aspect 34 is a computer-readable medium (e.g., a non-transitory computer-readable medium) storing computer executable code, where the code when executed by a processor causes the processor to implement any of aspects 18 to 30.

What is claimed is:

1. An apparatus for wireless communication at a network entity, comprising:
a memory; and
at least one processor coupled to the memory and, based at least in part on information stored in the memory, the at least one processor is configured to:
transmit a configuration to at least one network node to configure the at least one network node to perform an uplink (UL)-based positioning measurement with at least one machine learning (ML) model, wherein each of the at least one ML model is associated with a corresponding ML model identification (ID) in which the at least one network node uses for the UL-based positioning measurement, wherein the UL-based positioning measurement is for a set of sounding reference signals (SRSs) from a user equipment (UE);
  receive the UL-based positioning measurement for the set of SRSs from the at least one network node; and
  estimate a position of the UE based on the UL-based positioning measurement for the set of SRSs.

2. The apparatus of claim 1, wherein the configuration further configures the at least one network node to perform a feature extraction for the UL-based positioning measurement, wherein the at least one processor is further configured to:
  receive a set of feature extractions for the UL-based positioning measurement from the at least one network node; and
  combine the set of feature extractions, wherein the position of the UE is estimated further based on the combined set of feature extractions.

3. The apparatus of claim 2, wherein the set of feature extractions is associated with at least one supported UL-based positioning measurement or at least one updated UL-based positioning measurement.

4. The apparatus of claim 1, wherein the at least one processor is configured to:
  receive an indication from the at least one network node for a capability to support the UL-based positioning measurement with the at least one ML model, wherein the configuration is configured to be transmitted to the at least one network node based on the indication.

5. The apparatus of claim 4, wherein the at least one processor is configured to receive the indication from the at least one network node separately per positioning technique associated with the UL-based positioning measurement, per bandwidth used for the UL-based positioning measurement, or per ML model ID.

6. The apparatus of claim 1, wherein the at least one processor is configured to transmit the configuration in a measurement request message, and wherein the corresponding ML model ID for each of the at least one ML model is an information element (IE) of the measurement request message.

7. The apparatus of claim 1, wherein the UL-based positioning measurement corresponds to a default behavior if the UL-based positioning measurement is not associated with the at least one ML model or the corresponding ML model ID.

8. The apparatus of claim 1, wherein the UL-based positioning measurement includes:
  relative time of arrival (RTOA) measurement,
  reception (Rx)-transmission (Tx) (Rx-Tx) time difference measurement,
  angle of arrival (AoA) measurement, or
  a combination thereof.

9. The apparatus of claim 1, wherein the configuration includes a list of resources or resource sets associated with the at least one ML model.

10. The apparatus of claim 1, wherein the configuration includes one or more conditions in which the at least one ML model is to be applied by the at least one network node.

11. The apparatus of claim 10, wherein the one or more conditions include at least one of:
  an availability of a number of available antenna panels,
  a match with an area identifier (ID), or
  an existence of an antenna panel configuration that supports the at least one ML model.

12. The apparatus of claim 1, further comprising at least one of a transceiver or an antenna coupled to the at least one processor, wherein the at least one processor is further configured to:
  transmit, via at least one of the transceiver or the antenna, the at least one ML model to the at least one network node.

13. The apparatus of claim 1, wherein the network entity is a location server or a location management function (LMF) and the at least one network node includes a base station, a component of the base station, a transmission reception point (TRP), or a combination thereof.

14. A method of wireless communication at a network entity, comprising:
  transmitting a configuration to at least one network node to configure the at least one network node to perform an uplink (UL)-based positioning measurement with at least one machine learning (ML) model, wherein each of the at least one ML model is associated with a corresponding ML model identification (ID) in which the at least one network node uses for the UL-based positioning measurement, wherein the UL-based positioning measurement is for a set of sounding reference signals (SRSs) from a user equipment (UE);
  receiving the UL-based positioning measurement for the set of SRSs from the at least one network node; and
  estimating a position of the UE based on the UL-based positioning measurement for the set of SRSs.

15. The method of claim 14, wherein the configuration further configures the at least one network node to perform a feature extraction for the UL-based positioning measurement, the method further comprising:
  receiving a set of feature extractions for the UL-based positioning measurement from the at least one network node; and
  combining the set of feature extractions, wherein the position of the UE is estimated further based on the combined set of feature extractions.

16. An apparatus for wireless communication at a network node, comprising:
  a memory; and
  at least one processor coupled to the memory and, based at least in part on information stored in the memory, the at least one processor is configured to:
    receive a configuration from a network entity to perform an uplink (UL)-based positioning measurement with at least one machine learning (ML) model, wherein each of the at least one ML model is associated with a corresponding ML model identification (ID) to be used for the UL-based positioning measurement, wherein the UL-based positioning measurement is for a set of sounding reference signals (SRSs) from a user equipment (UE);
    perform the UL-based positioning measurement for the set of SRSs from the UE with the at least one ML model; and
    transmit the UL-based positioning measurement for the set of SRSs to the network entity.

17. The apparatus of claim 16, wherein the configuration further configures the network node to perform a feature extraction for the UL-based positioning measurement, wherein the at least one processor is further configured to:
  extract at least one feature from the UL-based positioning measurement; and
  transmit the at least one feature to the network entity.

18. The apparatus of claim 17, wherein the feature extraction for the UL-based positioning measurement is associated with at least one supported UL-based positioning measurement or at least one updated UL-based positioning measurement.

19. The apparatus of claim 16, wherein the at least one processor is further configured to:
    transmit an indication to the network entity for a capability to support the UL-based positioning measurement with the at least one ML model, wherein the configuration is configured to be received from the network entity based on the indication.

20. The apparatus of claim 19, wherein the at least one processor is configured to transmit the indication to the network entity separately per positioning technique associated with the UL-based positioning measurement, per bandwidth used for the UL-based positioning measurement, or per ML model ID.

21. The apparatus of claim 16, wherein the configuration is configured to be received in a measurement request message, and wherein the corresponding ML model ID for each of the at least one ML model is an information element (IE) of the measurement request message.

22. The apparatus of claim 16, wherein the at least one processor is further configured to:
    perform the UL-based positioning measurement with a default behavior if the UL-based positioning measurement is not associated with the at least one ML model or the corresponding ML model ID.

23. The apparatus of claim 16, wherein the UL-based measurement includes:
    relative time of arrival (RTOA) measurement,
    reception (Rx)-transmission (Tx) (Rx-Tx) time difference measurement,
    angle of arrival (AoA) measurement, or
    a combination thereof.

24. The apparatus of claim 16, wherein the configuration includes a list of resources or resource sets associated with the at least one ML model.

25. The apparatus of claim 16, wherein the configuration includes one or more conditions in which the at least one ML model is to be applied by the network node.

26. The apparatus of claim 25, wherein the one or more conditions include at least one of:
    an availability of a number of available antenna panels,
    a match with an area identifier (ID), or
    an existence of an antenna panel configuration that supports the at least one ML model.

27. The apparatus of claim 16, further comprising at least one of a transceiver or an antenna coupled to the at least one processor, wherein the at least one processor is further configured to:
    receive, via at least one of the transceiver or the antenna, the at least one ML model from the network entity, or from a model repository entity in a core network based on the corresponding ML model ID or a universal ML model ID associated with the at least one ML model.

28. The apparatus of claim 16, wherein the network node is a base station, a component of the base station, or a transmission reception point (TRP), and the network entity is a location server or a location management function (LMF).

29. A method of wireless communication at a network node, comprising:
    receiving a configuration from a network entity to perform an uplink (UL)-based positioning measurement with at least one machine learning (ML) model, wherein each of the at least one ML model is associated with a corresponding ML model identification (ID) to be used for the UL-based positioning measurement, wherein the UL-based positioning measurement is for a set of sounding reference signals (SRSs) from a user equipment (UE);
    performing the UL-based positioning measurement for the set of SRSs from the UE with the at least one ML model; and
    transmitting the UL-based positioning measurement for the set of SRSs to the network entity.

30. The method of claim 29, wherein the configuration further configures the network node to perform a feature extraction for the UL-based positioning measurement, the method further comprising:
    extracting at least one feature from the UL-based positioning measurement; and
    transmitting the at least one feature to the network entity.

* * * * *